US011993010B2

(12) United States Patent
Negri Jimenez et al.

(10) Patent No.: US 11,993,010 B2
(45) Date of Patent: May 28, 2024

(54) THREE-DIMENSIONAL PRINTING

(71) Applicant: Hewlett-Packard Development Company, L.P., Spring, TX (US)

(72) Inventors: Graciela E. Negri Jimenez, San Diego, CA (US); Emre Hiro Discekici, San Diego, CA (US); Shannon Reuben Woodruff, San Diego, CA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 145 days.

(21) Appl. No.: 17/298,642

(22) PCT Filed: Sep. 19, 2019

(86) PCT No.: PCT/US2019/051904
§ 371 (c)(1),
(2) Date: May 31, 2021

(87) PCT Pub. No.: WO2021/025713
PCT Pub. Date: Feb. 11, 2021

(65) Prior Publication Data
US 2022/0152922 A1 May 19, 2022

Related U.S. Application Data

(63) Continuation-in-part of application No. PCT/US2019/045622, filed on Aug. 8, 2019.

(51) Int. Cl.
*B29C 64/188* (2017.01)
*B29C 64/165* (2017.01)
(Continued)

(52) U.S. Cl.
CPC .......... *B29C 64/188* (2017.08); *B29C 64/165* (2017.08); *B33Y 10/00* (2014.12);
(Continued)

(58) Field of Classification Search
CPC ... C09D 11/328; C09D 11/324; C09D 11/322; C09D 7/61; C09D 11/101; C09D 11/102;
(Continued)

(56) References Cited

U.S. PATENT DOCUMENTS 5,798,144 A   8/1998  Varanasi et al.
7,032,514 B2  4/2006  Mori et al.
(Continued)

FOREIGN PATENT DOCUMENTS

CN       106182770 A    12/2016
KR   10-2018-0108185 A  10/2018
(Continued)

OTHER PUBLICATIONS

Lv Juan et al., 3D printing of a mechanically durable superhydrophobic . . . , May 15, 2017, Journal of Materials Chemistry A.
(Continued)

*Primary Examiner* — Monica A Huson
(74) *Attorney, Agent, or Firm* — HP Inc. Patent Department

(57) ABSTRACT

In an example of a method for three-dimensional (3D) printing, a polymeric build material is applied to form a build material layer. A fusing agent is selectively applied, based on a 3D object model, onto the build material layer to form a patterned portion. A hydrophobic agent is selectively applied, based on the 3D object model, onto at least a portion of the patterned portion. The hydrophobic agent includes a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt %. The build material layer is exposed to energy (Continued)

to selectively coalesce the patterned portion and form a 3D object layer having a hydrophobic portion.

16 Claims, 7 Drawing Sheets

(51) Int. Cl.
| | |
|---|---|
| *B33Y 10/00* | (2015.01) |
| *B33Y 70/00* | (2020.01) |
| *C09D 7/61* | (2018.01) |
| *C09D 7/63* | (2018.01) |
| *C09D 11/033* | (2014.01) |
| *C09D 11/101* | (2014.01) |
| *C09D 11/102* | (2014.01) |
| *C09D 11/322* | (2014.01) |
| *C09D 11/324* | (2014.01) |
| *C09D 11/328* | (2014.01) |
| *B29K 83/00* | (2006.01) |

(52) U.S. Cl.
CPC .............. *B33Y 70/00* (2014.12); *C09D 7/61* (2018.01); *C09D 7/63* (2018.01); *C09D 11/033* (2013.01); *C09D 11/101* (2013.01); *C09D 11/102* (2013.01); *C09D 11/322* (2013.01); *C09D 11/324* (2013.01); *C09D 11/328* (2013.01); *B29K 2083/00* (2013.01); *B29K 2995/0093* (2013.01)

(58) Field of Classification Search
CPC ....... C09D 7/63; C09D 11/033; B29C 64/188; B29C 64/30; B29C 64/165; B33Y 40/20; B33Y 10/00; B33Y 70/00; C08L 83/04; B29K 2995/0093; B29K 2083/00; C08G 77/18
See application file for complete search history.

(56) References Cited

U.S. PATENT DOCUMENTS

| | | |
|---|---|---|
| 7,550,518 B2 | 6/2009 | Bredt et al. |
| 9,217,069 B2 | 12/2015 | Wan et al. |
| 10,322,544 B1 | 6/2019 | Simpson |
| 2006/0009549 A1 | 1/2006 | Legters et al. |
| 2009/0148813 A1 | 6/2009 | Sun et al. |
| 2019/0047216 A1 | 2/2019 | Emamjomeh et al. |
| 2019/0100626 A1 | 4/2019 | Durban et al. |
| 2022/0112393 A1* | 4/2022 | Negri Jimenez ..... B29C 64/165 |
| 2022/0363923 A1* | 11/2022 | Negri Jimenez ...... B33Y 70/00 |

FOREIGN PATENT DOCUMENTS

| | | |
|---|---|---|
| WO | WO-2016134972 A1 | 9/2016 |
| WO | 2016/171724 A1 | 10/2016 |
| WO | WO-2018095837 A1 | 5/2018 |
| WO | 2019/053258 A1 | 3/2019 |
| WO | 2019/108201 A1 | 6/2019 |
| WO | WO-2019108288 A1 | 6/2019 |

OTHER PUBLICATIONS

Song et al., "A Study on the Rheological and Mechanical Properties of Photo-Curable Ceramic/Polymer Composites with Different Silane Coupling Agents for SLA 3D Printing Technology", Nanomaterials, vol. 8(2), 2018, 93, 12 pages.

* cited by examiner

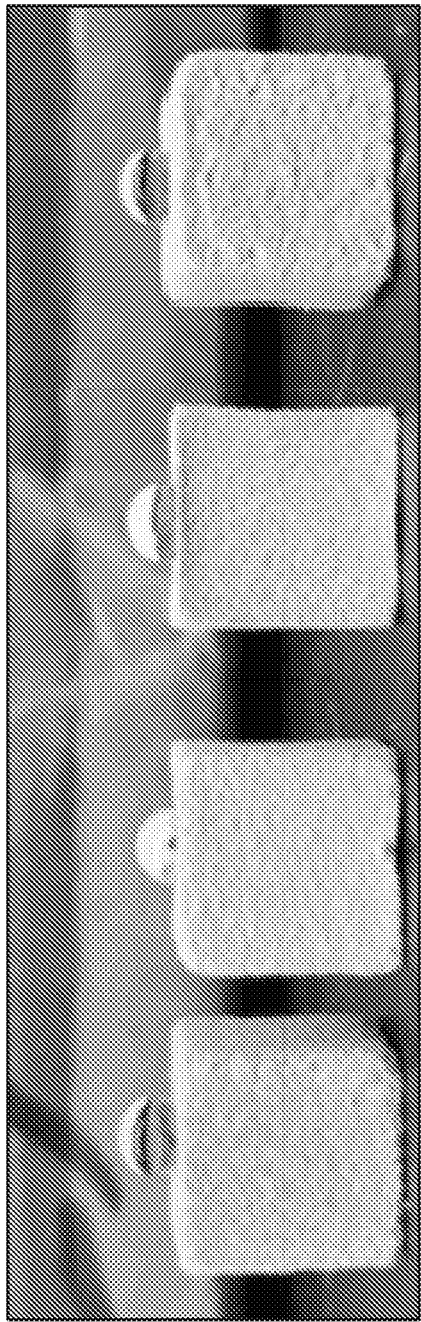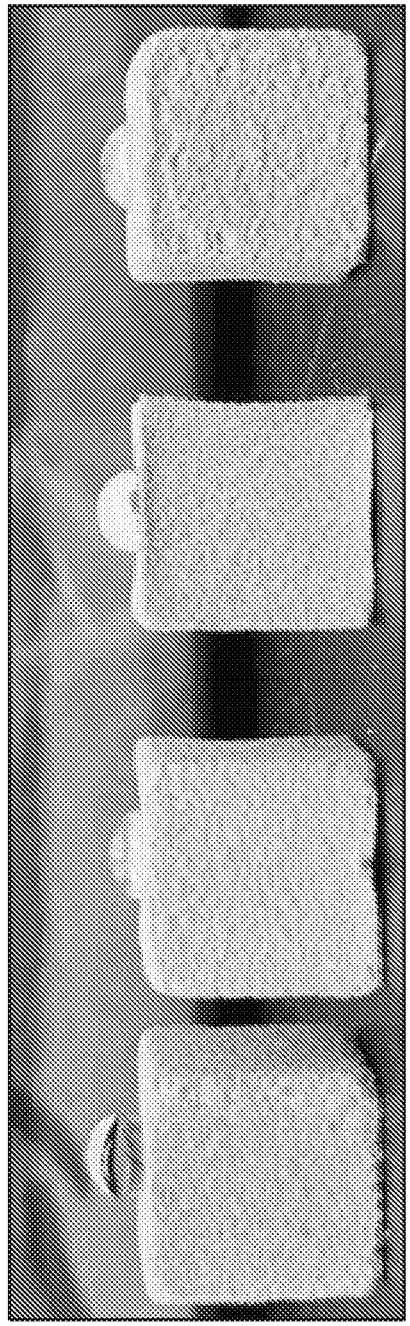

THREE-DIMENSIONAL PRINTING

CROSS-REFERENCE TO RELATED APPLICATIONS

This application claims priority to International Patent Application Number PCT/US2019/045622 filed Aug. 8, 2019, the content of which is incorporated by reference herein in its entirety.

BACKGROUND

Three-dimensional (3D) printing may be an additive printing process used to make three-dimensional solid parts from a digital model. 3D printing is often used in rapid product prototyping, mold generation, mold master generation, and short run manufacturing. Some 3D printing techniques are considered additive processes because they involve the application of successive layers of material (which, in some examples, may include build material, binder and/or other printing liquid(s), or combinations thereof). This is unlike traditional machining processes, which often rely upon the removal of material to create the final part. Some 3D printing methods use chemical binders or adhesives to bind build materials together. Other 3D printing methods involve at least partial coalescence of the build material, and the mechanism for material coalescence (e.g., curing, thermal merging/fusing, melting, sintering, etc.) may depend upon the type of build material used. For some materials, at least partial coalescence may be accomplished using heat-assisted extrusion, and for some other materials (e.g., polymerizable materials), curing or fusing may be accomplished using, for example, ultra-violet light or infrared light.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIG. 8A and FIG. 8B are black and white reproductions of originally colored photographs depicting example and comparative example 3D printed objects at different times during a deionized water droplet test.

DETAILED DESCRIPTION

Figure 1:
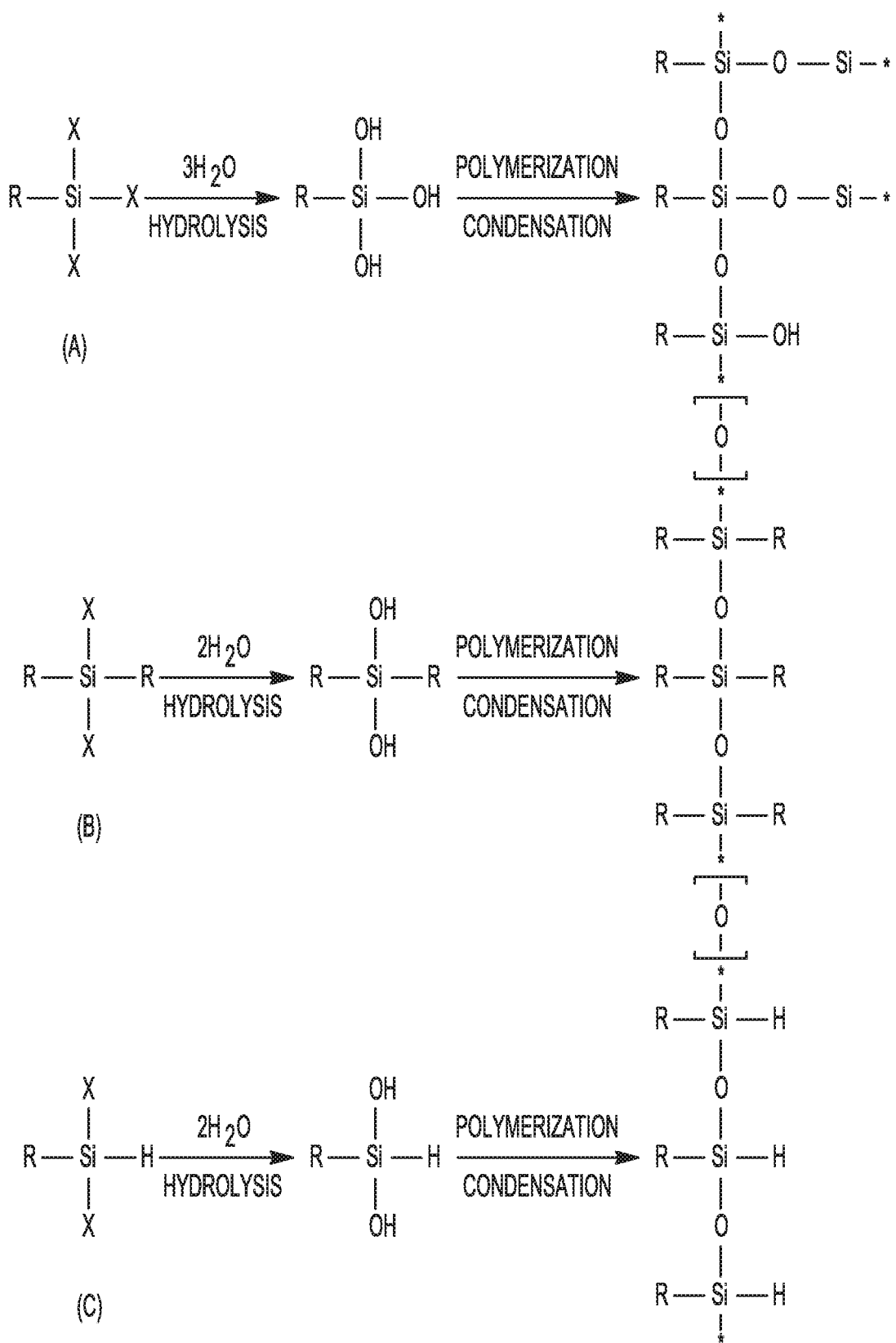
FIG. 1 schematically depicts a variety of example self-crosslinking reactions that can occur in forming polysiloxanes using an example hydrophobic agent during a 3D printing method.

The surface properties of three-dimensionally printed objects are generally dictated by the properties of the bulk build material that is used. For example, 3D printed objects generated with polyamide-6,6 are more hydrophilic than 3D printed objects generated with, e.g., polypropylene or polyamide-12. However, manufacturing processes can lead to physical characteristics (e.g., porosity), which allow for surface wetting and water permeation, even in 3D printed objects printed with relatively hydrophobic bulk build materials. In the examples disclosed herein, a hydrophobic agent may be used to generate 3D printed parts with tailored surface hydrophobicity, which may be vastly different from the intrinsic property of the bulk build material that is used. This is due to the fact that the hydrophobic agent is selectively jetted on the build material during the printing process, as well as on the exterior surfaces on the 3D printed objects. The ability to jet the hydrophobic agent via any suitable inkjet printing technique enables controlled (and potentially varying) hydrophobicity to be spatially incorporated into the periphery of 3D printed objects at the voxel level.

Still further, the hydrophobic agent disclosed herein alters the water repellency property of the bulk build material without significant chemical modification to the bulk build material.

The introduction of selective surface hydrophobicity to 3D printed objects can help to maintain surfaces that are clean and/or dry. In some applications, clean and/or dry surfaces can also help to prevent ice formation, reduce rust formation, and increase protection of electrical systems.

Throughout this disclosure, a weight percentage that is referred to as "wt % active" refers to the loading of an active component of a dispersion or other formulation that is present, e.g., in the hydrophobic agent, fusing agent, detailing agent, etc. For example, an energy absorber, such as carbon black, may be present in a water-based formulation (e.g., a stock solution or dispersion) before being incorporated into the fusing agent vehicle. In this example, the wt % actives of the carbon black accounts for the loading (as a weight percent) of the carbon black solids that are present in the fusing agent, and does not account for the weight of the other components (e.g., water, etc.) that are present in the stock solution or dispersion with the carbon black. The term "wt %," without the term actives, refers to either i) the loading (in the hydrophobic agent, fusing agent, etc.) of a 100% active component that does not include other non-active components therein, or ii) the loading (in the hydrophobic agent, fusing agent, etc.) of a material or component that is used "as is" and thus the wt % accounts for both active and non-active components.

3D Printing Fluid Kits, 3D Printing Kits, and 3D Printing Compositions

The examples disclosed herein include fluid kits for three-dimensional (3D) printing, three-dimensional (3D) printing kits, and three-dimensional (3D) printing compositions.

An example of a multi-fluid kit includes a hydrophobic agent including a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt %; a core fusing agent including an energy absorber having absorption at wavelengths ranging from 400 nm to 4000 nm; and a primer fusing agent including a plasmonic resonance absorber having absorption at wavelengths ranging from 800 nm to 4000 nm and having transparency at wavelengths ranging from 400 nm to 780 nm. Some examples of the multi-fluid kit further include a detailing agent. Other examples of the multi-fluid kit further include a coloring agent. Still other examples of the multi-fluid kit further include both a detailing agent and a coloring agent.

Any example of the multi-fluid kit may also be part of a 3D printing kit and/or composition. In addition to the fluids of the multi-fluid kit, the 3D printing kit also includes a polymeric build material.

It is to be understood that the components of the fluid kits and/or of the 3D printing kits may be maintained separately until used together in examples of the 3D printing method disclosed herein.

As used herein, it is to be understood that the terms "material set" or "kit" may, in some instances, be synonymous with "composition." Further, "material set" and "kit" are understood to be compositions comprising one or more components where the different components in the compositions are each contained in one or more containers, separately or in any combination, prior to and during printing but these components can be combined together during printing. The containers can be any type of a vessel, box, or receptacle made of any material.

As mentioned above, various agents may be included in the fluid kits and/or 3D printing kits disclosed herein. Example compositions of the hydrophobic agent, the fusing agents, the detailing agent, the coloring agent, and the polymeric build material will now be described.

Hydrophobic Agent

In the examples disclosed herein, the hydrophobic agent includes an aqueous phase and a lipophilic phase discontinuously dispersed within an aqueous phase. As such, the hydrophobic agent includes an emulsion. The lipophilic phase of the emulsion includes an organosilane.

The organosilane includes a central silicon atom having four positions at which a hydrogen atom or a functional group can be attached. In the examples disclosed herein, a lipophilic (hydrophobic) moiety is attached at one or two of the four positions. In the examples disclosed herein, one or two lipophilic moieties can be attached to the central silicon atom, and two or three hydrolyzable moieties can be attached to the central silicon atom.

Formula I below provides an example organosilane that can be dispersed as a discontinuous phase in the hydrophobic agent:

(formula I)

where R includes a lipophilic moiety; X is a hydrolyzable moiety; n is 1 or 2; and p is 2 or 3.

The lipophilic moiety, represented by R, can independently be selected from an aliphatic or alicyclic hydrocarbon, e.g., C6 to C24 hydrocarbon, such as C6 to C24 straight-chained alkyl, branched alkyl, alicyclic, or a combination thereof. The term "C6 to C24 hydrocarbon" refers to both aliphatic hydrocarbon chains, alicyclic hydrocarbons, and combinations of aliphatic hydrocarbon chains and alicyclic hydrocarbons, but does not include aromatic hydrocarbons. Thus, the hydrocarbons can be aliphatic or alicyclic. In one example, hydrocarbon may also be saturated. The aliphatic hydrocarbon chains can be either branched or straight-chained aliphatic hydrocarbons, alicyclic hydrocarbons, or a combination of aliphatic and alicyclic hydrocarbons, for example. In some examples, the aliphatic or alicyclic hydrocarbon can be substituted with a heteroatom, such as oxygen, sulfur, or nitrogen, but such a substitution can be minimal, e.g., one or two locations, and if present, the lipophilic moiety still provides enough hydrophobicity to the organosilane compound for it to become emulsified into a discontinuous phase within the hydrophobic agent in the presence of the surfactant. In some examples, the C6 to C24 hydrocarbon is directly coupled to a heteroatom selected from oxygen, nitrogen, sulfur, or a combination thereof. The lipophilic moiety can help to impart the desired hydrophobicity.

The hydrolyzable moiety, represented by X, can independently be selected from an alkoxy and a halogen. Examples of suitable alkoxy groups include methoxy, ethoxy, etc. Examples of suitable halogens include chlorine, bromine, etc. The hydrolyzable moiety may be involved in cross-linking by condensation to form polysiloxanes when the emulsion becomes disrupted upon printing into the polymeric build material during 3D printing.

Three examples of organosilane compounds are shown in FIG. 1. In each of these examples, R again represents the lipophilic moieties and X again represents hydrolyzable moieties. For example, organosilane compound (A) includes one lipophilic moiety and three hydrolyzable moieties; organosilane (B) includes two lipophilic moieties and two hydrolyzable moieties; and organosilane (C) includes one lipophilic moiety and two hydrolyzable moieties. Organosilane (C) also includes hydrogen at one of the four positions on the central silicon atom.

Though not shown in FIG. 1, in some examples, there can be additional organosilane compounds present, such as tetraalkoxysilanes. If present, tetraalkoxysilanes can be included in an amount ranging from about 0.01 wt % to about 5 wt %, based on a total weight of the hydrophobic agent. As other examples, the additional tetraalkoxysilane may be present in amounts ranging from about 0.05 wt % to about 3.5 wt %, or from about 0.1 wt % to about 2 wt %, or from about 0.01 wt % to about 1 wt %, based on a total weight of the hydrophobic agent. In some examples of the hydrophobic agent, there are no tetraalkoxysilanes present.

As depicted in FIG. 1, the organosilanes can be self-crosslinkable, through the multiple hydrolyzable moieties (X) attached to the central silicon atom to form polysiloxanes. The various polysiloxanes are shown in FIG. 1 as being linked together with a siloxane group with the oxygen shown in brackets, e.g., [—O—]. This linkage is provided by way of example, and it is to be understood that the linking polymer can be longer, or the various structures formed can be unlinked.

It is to be understood that any or all of the structures shown at (A)-(C) in FIG. 1 may or may not be present in a common formulation. These structures are provided by way of example to illustrate various possible combinations and structures that can be formed.

In one example, the organosilanes can be dialkoxysilanes, trialkoxysilanes, or a combination thereof. In another example, the organosilane can be a trialkoxyorganosilane compound including a C6 to C14 hydrocarbon. Two specific examples of organosilane compounds that can be used in accordance with the present disclosure are shown as Formula II:

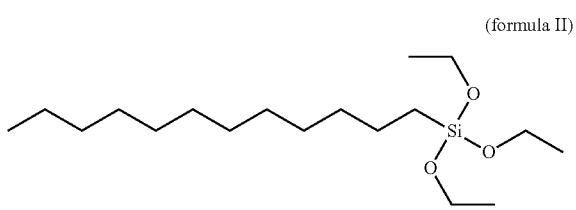 [SMILES: CCCCCCCCCCCC[Si](OCC)(OCC)OCC]

(formula II)

which is dodecyltriethoxysilane, and Formula III:

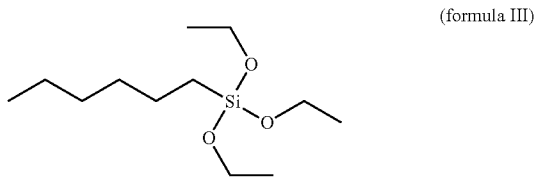 [SMILES: CCCCCC[Si](OCC)(OCC)OCC]

(formula III)

which is hexyltriethoxysilane.

Formulas II and III depict triethoxysilanes, but it is understood that either could likewise be a diethoxysilane, a trimethoxysilane, a dimethoxysilane, a trichlorosilane, a dichlorosilane, a tribromosilane, a dibromosilane, etc. The ethoxysilanes could likewise be propyloxy silanes or methoxy silanes.

The organosilane may be selected, in part, by its rate of hydrolysis. Triethoxysilanes may exhibit a slow enough rate of hydrolysis that they react at a rate that may coincide well with printing speeds. Methoxysilanes react more quickly, but may also be desirable in some applications.

The organosilane may be present in the hydrophobic agent at from about 1 wt % to about 20 wt %, based on the total weight of the hydrophobic agent. In other examples, the organosilane can be present in the hydrophobic agent in an amount ranging from about 2 wt % to about 10 wt %, or from about 2 wt % to about 15 wt %, or from about 3 wt % to about 10 wt %. The listed amounts for the organosilane represent the total amount of the organosilane in the hydrophobic agent, and not the amount of the emulsion (which also includes water and surfactant). It is to be understood that the weight percent of the organosilane in the emulsion may be higher than the values presented for the hydrophobic agent, depending, in part, upon how much of the emulsion is to be incorporated into a vehicle to form the hydrophobic agent. As one example, the emulsion may have 10 wt % of the organosilane and the hydrophobic agent may have 5 wt % of the organosilane.

The organosilane is discontinuously dispersed within the aqueous phase of the emulsion by a surfactant. In an example, the surfactant is an anionic salt surfactant, such as an alkyldiphenyloxide disulfonate salts (e.g., the DOWFAX™ series, such a 2A1, 3B2, 8390, C6L, C10L, and 30599, from Dow). Other surfactants, such as non-ionic surfactants or cationic surfactants, may be used. The surfactant selection will depend, at least in part, on the hydrophobic group of the organosilane.

The organosilane and the surfactant, for example, can be present in the emulsion, and in the hydrophobic agent, at a weight ratio from about 4:1 to about 1:1.

The emulsion can be prepared by combining water and the surfactant, and in some instances an acid (e.g., acetic acid) or a base (e.g., sodium hydroxide). The hydrolysis of the silanes to silanols may occur readily, but the rate of reaction can be modulated (e.g., sped up) by addition of the acid or base. In some instances, the acid or base may be added in an amount up to 1 wt % of the total weigh to the emulsion. The organosilane with at least one lipophilic moiety, such as that shown in Formula I, may be added dropwise slowly over time. This mixture may be stirred and then allowed to sit for several hours, e.g., 72+ hours in some examples.

The rate at which hydrolysis occurs can be dependent on the number and structure of hydrolyzable groups. Hydrolysis can occur within the emulsion, prior to its addition to a vehicle to form the hydrophobic agent. In some instances, the reaction time is selected so that complete hydrolysis of the silane to the silanol occurs within the emulsion, so that stable emulsion equilibrium is obtained.

As shown in FIG. 1, the hydrolysis reaction can introduce hydroxyl groups to the organosilane compound, which can then be polymerized or condensed to form any of a number of oligomeric or polymeric siloxanes, where are referred to herein collective as "polysiloxanes." The application of heat during 3D printing can, for example, promote the formation of self-polymerized polysiloxane structures, such as that shown in FIG. 1. pH modification when the hydrophobic agent is jetted into a layer of the polymeric build material can also facilitate formation of the polysiloxanes. The hydrophobic groups of the polysiloxanes can contribute to the desired hydrophobicity.

The emulsification of the organosilane disperses the compound so that it can be incorporated into an inkjettable formulation (the hydrophobic agent), but also preserves the monomeric silanol in solution and prevents premature polymerization or condensation.

The emulsion is combined with a vehicle to form the hydrophobic agent. The amount of the emulsion that is included in the vehicle is such that the total amount of the organosilane (or its corresponding silanol) ranges from about 1 wt % to about 20 wt % of the total weight of the hydrophobic agent.

As used herein, "vehicle" may refer to the liquid in which the organosilane emulsion is dispersed to form the hydrophobic agent. In some examples, the vehicle includes a co-solvent, a surfactant, an anti-kogation agent, an antimicrobial agent, a chelating agent, a buffer, and water. The vehicle may also include additional components, such as a humectant. In other examples, the vehicle consists of any combination of the listed components, without any other components.

Water may make up the balance of the hydrophobic agent. As such, the amount of water may vary depending upon the amounts of the other components that are included. In some examples, the water can be present in the hydrophobic agent at from about 40 wt % to about 96 wt %. As an example, deionized water may be used.

The vehicle may also include co-solvent(s). Classes of organic co-solvents that may be used in the hydrophobic agent include aliphatic alcohols, aromatic alcohols, diols, glycol ethers, polyglycol ethers, lactams, formamides (substituted and unsubstituted), acetamides (substituted and unsubstituted), glycols, and long chain alcohols. Examples of these co-solvents include primary aliphatic alcohols, secondary aliphatic alcohols, 1,2-alcohols, 1,3-alcohols, 1,5-alcohols, 1,6-hexanediol or other diols (e.g., 1,5-pentanediol, 2-methyl-1,3-propanediol, etc.), ethylene glycol alkyl ethers, propylene glycol alkyl ethers, higher homologs ($C_6$-$C_{12}$) of polyethylene glycol alkyl ethers, triethylene glycol, tetraethylene glycol, tripropylene glycol methyl ether, N-alkyl caprolactams, unsubstituted caprolactams, 2-pyrrolidone, 1-methyl-2-pyrrolidone, 1-(2-hydroxyethyl)-

2-pyrrolidone, 2-methyl-1,3-propanediol, and the like. Other examples of organic co-solvents include dimethyl sulfoxide (DMSO), isopropyl alcohol, ethanol, pentanol, acetone, or the like. Still other suitable co-solvents include xylene, methyl isobutyl ketone, 3-methoxy-3-methyl-1-butyl acetate, ethyl acetate, butyl acetate, propylene glycol monomethyl ether, ethylene glycol mono tert-butyl ether, dipropylene glycol methyl ether, diethylene glycol butyl ether, ethylene glycol monobutyl ether, 3-5 Methoxy-3-Methyl-1-butanol, isobutyl alcohol, 1,4-butanediol, N,N-dimethyl acetamide, and combinations thereof.

In an example, the total amount of the co-solvent(s) present in the hydrophobic agent ranges from about 1 wt % to about 35 wt %, based on the total weight of the hydrophobic agent. In an example, the hydrophobic agent include from about 10 wt % to about 20 wt %, or from about 5 wt % to about 18 wt % of the co-solvent(s).

The vehicle may include surfactant(s) to improve the jettability of the hydrophobic agent. Some suitable surfactants may include alkyl polyethylene oxides, alkyl phenyl polyethylene oxides, polyethylene oxide block copolymers, acetylenic polyethylene oxides, polyethylene oxide (di)esters, polyethylene oxide amines, protonated polyethylene oxide amines, protonated polyethylene oxide amides, dimethicone20 copolyols, substituted amine oxides, and the like. Some specific examples include a self-emulsifiable, non-ionic wetting agent based on acetylenic diol chemistry (e.g., SURFYNOL® SEF from Evonik Degussa), a non-ionic fluorosurfactant (e.g., CAPSTONE® fluorosurfactants, such as CAPSTONE® FS-35, from Chemours), and combinations thereof. In other examples, the surfactant is an ethoxylated low-foam wetting agent (e.g., SURFYNOL® 440 or SURFYNOL® CT-111 from Evonik Degussa) or an ethoxylated wetting agent and molecular defoamer (e.g., SURFYNOL® 420 from Evonik Degussa). Still other suitable surfactants include non-ionic wetting agents and molecular defoamers (e.g., SURFYNOL® 104E from Evonik Degussa) or water-soluble, non-ionic surfactants (e.g., TERGITOL™ TMN-6, TERGITOL™ 15-S-7, or TERGITOL™ 15-S-9 (a secondary alcohol ethoxylate) from The Dow Chemical Company or TEGO® Wet 510 (non-ionic silicone free, organic surfactant) available from Evonik Degussa). Yet another suitable surfactant includes alkyldiphenyloxide disulfonate (e.g., the DOWFAX™ series, such a 2A1, 3B2, 8390, C6L, C10L, and 30599, from The Dow Chemical Company).

Whether a single surfactant is used or a combination of surfactants is used, the total amount of surfactant(s) in the hydrophobic agent may range from about 0.01 wt % active to about 10 wt % active based on the total weight of the hydrophobic agent. In an example, the total amount of surfactant(s) in the fusing agent may be about 0.75 wt % active based on the total weight of the fusing agent. It is to be understood that these amounts to do not account for the amount of surfactant that is added with the emulsion.

An anti-kogation agent may be included in the hydrophobic agent that is to be jetted using thermal inkjet printing. Kogation refers to the deposit of dried printing liquid (e.g., hydrophobic agent) on a heating element of a thermal inkjet printhead. Anti-kogation agent(s) is/are included to assist in preventing the buildup of kogation. Examples of suitable anti-kogation agents include oleth-3-phosphate (e.g., commercially available as CRODAFOS® 03A or CRODAFOS® N-3 acid from Croda), dextran 500k, CRODAFOS™ HCE (phosphate-esterfrom Croda Int.), CRODAFOS® N10 (oleth-10-phosphate from Croda Int.), DISPERSOGEN® LFH (polymeric dispersing agent with aromatic anchoring groups, acid form, anionic, from Clariant), or a combination of oleth-3-phosphate and a low molecular weight (e.g., <5,000) acrylic acid polymer (e.g., commercially available as CARBOSPERSE™ K-7028 Polyacrylate from Lubrizol).

Whether a single anti-kogation agent is used or a combination of anti-kogation agents is used, the total amount of anti-kogation agent(s) in the hydrophobic agent may range from greater than 0.01 wt % active to about 1.5 wt % active based on the total weight of the hydrophobic agent. In an example, the anti-kogation agent is included in an amount ranging from about 0.025 wt % active to about 0.60 wt % active. In an example, the anti-kogation agent is included in an amount ranging from about 0.25 wt % active to about 0.50 wt % active.

The vehicle of the hydrophobic agent may also include antimicrobial agent(s). Suitable antimicrobial agents include biocides and fungicides. Example antimicrobial agents may include the NUOSEPT™ (Troy Corp.), UCARCIDE™ (The Dow Chemical Company), ACTICIDE® B20 (Thor Chemicals), ACTICIDE® M20 (Thor Chemicals), ACTICIDE® MBL (blends of 2-methyl-4-isothiazolin-3-one (MIT), 1,2-benzisothiazolin-3-one (BIT) and Bronopol) (Thor Chemicals), AXIDE™ (Planet Chemical), NIPACIDE™ (Clariant), blends of 5-chloro-2-methyl-4-isothiazolin-3-one (CIT or CMIT) and MIT under the tradename KATHON™ (The Dow Chemical Company), and combinations thereof. Examples of suitable biocides include an aqueous solution of 1,2-benzisothiazolin-3-one (e.g., PROXEL® GXL from Arch Chemicals, Inc.), quaternary ammonium compounds (e.g., BARDAC® 2250 and 2280, BARQUAT® 50-65B, and CARBOQUAT® 250-T, all from Lonza Ltd. Corp.), and an aqueous solution of methylisothiazolone (e.g., KORDEK® MLX from The Dow Chemical Company).

In an example, the hydrophobic agent may include a total amount of antimicrobial agents that ranges from about 0.0001 wt % active to about 1 wt % active. In an example, the antimicrobial agent(s) is/are a biocide(s) and is/are present in the hydrophobic agent in an amount ranging from about 0.25 wt % active to about 0.35 wt % active (based on the total weight of the hydrophobic agent).

Chelating agents (or sequestering agents) may be included in the vehicle of the hydrophobic agent to eliminate the deleterious effects of heavy metal impurities. Examples of chelating agents include disodium ethylenediaminetetraacetic acid (EDTA-Na), ethylene diamine tetra acetic acid (EDTA), and methylglycinediacetic acid (e.g., TRILON® M from BASF Corp.).

Whether a single chelating agent is used or a combination of chelating agents is used, the total amount of chelating agent(s) in the hydrophobic agent may range from greater than 0 wt % active to about 2 wt % active based on the total weight of the hydrophobic agent. In an example, the chelating agent(s) is/are present in the hydrophobic agent in an amount of about 0.05 wt % active (based on the total weight of the hydrophobic agent).

The vehicle of the hydrophobic agent may also include a buffer to prevent undesirable changes in the pH. Examples of buffers include TRIS (tris(hydroxymethyl)aminomethane or TRIZMA®), bis-tris propane, TES (2-[(2-Hydroxy-1,1-bis(hydroxymethyl)ethyl)amino]ethanesulfonic acid), MES (2-ethanesulfonic acid), MOPS (3-(N-morpholino)propanesulfonic acid), HEPES (4-(2-hydroxyethyl)-1-piperazineethanesulfonic acid), DIPSO (3-(N,N-Bis[2-hydroxyethyl]amino)-2-hydroxypropanesulfonic acid), Tricine (N-[tris(hydroxymethyl)methyl]glycine), HEPPSO (pi-Hydroxy-4-(2-hydroxyethyl)-1-piperazinepropanesulfonic acid monohydrate), POPSO (Piperazine-1,4-bis(2-hydroxypropanesulfonic acid) dihydrate), EPPS (4-(2-Hydroxyethyl)-1-piperazinepropanesulfonic acid, 4-(2-Hydroxyethyl)piperazine-1-propanesulfonic acid), TEA (triethanolamine buffer solution), Gly-Gly (Diglycine), bicine (N,N-Bis(2-hydroxyethyl)glycine), HEPBS (N-(2-Hydroxyethyl)piperazine-N'-(4-butanesulfonic acid)), TAPS ([tris(hydroxymethyl)methylamino]propanesulfonic acid), AMPD (2-amino-2-methyl-1,3-propanediol), TABS (N-tris(Hydroxymethyl)methyl-4-aminobutanesulfonic acid), or the like.

Whether a buffer is used or a combination of buffers is used, the total amount of buffer(s) in the hydrophobic agent may range from greater than 0 wt % active to about 0.5 wt % active based on the total weight of the hydrophobic agent. In an example, the buffer(s) is/are present in the hydrophobic agent in an amount of about 0.1 wt % active (based on the total weight of the hydrophobic agent).

The vehicle of the hydrophobic agent may also include humectant(s). An example of a suitable humectant is ethoxylated glycerin having the following formula:

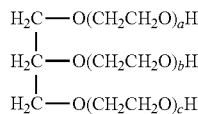

in which the total of a+b+c ranges from about 5 to about 60, or in other examples, from about 20 to about 30. An example of the ethoxylated glycerin is LIPONIC® EG-1 (LEG-1, glycereth-26, a+b+c=26, available from Lipo Chemicals).

In an example, the total amount of the humectant(s) present in the hydrophobic agent ranges from about 3 wt % active to about 10 wt % active, based on the total weight of the hydrophobic agent.

Fusing Agents

The fluid kit(s) and/or 3D printing kit(s) disclosed herein include one or more fusing agents.

Some examples of the fusing agent have substantial absorption (e.g., 80%) at least in the visible region (400 nm-780 nm). These examples of the fusing agent are referred to as the core fusing agent, or, in some instances, the black fusing agent. As described herein, the energy absorber (or active material) in the core fusing agent may also absorb energy in the infrared region (e.g., 800 nm to 4000 nm). This absorption generates heat suitable for coalescing/fusing the build material composition in contact therewith during 3D printing, which leads to 3D objects (or 3D objects regions) having mechanical integrity and relatively uniform mechanical properties (e.g., strength, elongation at break, etc.). This absorption, however, also results in strongly colored, e.g., black, 3D objects (or 3D objects regions).

Other examples of the fusing agent include an energy absorber having absorption at wavelengths ranging from 800 nm to 4000 nm and having transparency at wavelengths ranging from 400 nm to 780 nm. These examples of the fusing agent are referred to as the primer fusing agent, or, in some instances, the low tint fusing agent. This absorption and transparency allows the primer fusing agent to absorb enough radiation to coalesce/fuse the build material composition in contact therewith while enabling the 3D objects (or 3D objects regions) to be white or slightly colored.

Still other examples of the energy absorber absorb at least some of the wavelengths within the range of 400 nm to 4000 nm. Examples include glass fibers, titanium dioxide, clay, mica, talc, barium sulfate, calcium carbonate, phosphate pigments, and/or silicate pigments. These energy absorbers are often white or lightly colored and may be used in either the core fusing agent or the primer fusing agent.

Phosphates may have a variety of counterions, such as copper, zinc, iron, magnesium, calcium, strontium, the like, and combinations thereof. Examples of phosphates can include $M_2P_2O_7$, $M_4P_2O_9$, $M_5P_2O_{10}$, $M_3(PO_4)_2$, $M(PO_3)_2$, $M_2P_4O_{12}$, and combinations thereof, where M represents a counterion having an oxidation state of +2, such as those listed above or a combination thereof. For example, $M_2P_2O_7$ can include compounds such as $Cu_2P_2O_7$, $Cu/MgP_2O_7$, $Cu/ZnP_2O_7$, or any other suitable combination of counterions. Silicates can have the same or similar counterions as phosphates. Example silicates can include $M_2SiO_4$, $M_2Si_2O_6$, and other silicates where M is a counterion having an oxidation state of +2. For example, the silicate $M_2Si_2O_6$ can include $Mg_2Si_2O_6$, $Mg/CaSi_2O_6$, $MgCuSi_2O_6$, $Cu_2Si_2O_6$, $Cu/ZnSi_2O_6$, or other suitable combination of counterions. It is noted that the phosphates and silicates described herein are not limited to counterions having a +2 oxidation state, and that other counterions can also be used to prepare other suitable near-infrared pigments.

As used herein "absorption" means that at least 80% of radiation having wavelengths within the specified range is absorbed. Also used herein, "transparency" means that 25% or less of radiation having wavelengths within the specified range is absorbed.

Core Fusing Agent

Some examples of the core fusing agent are dispersions including an energy absorber (i.e., an active material). In some examples, the active material may be an infrared light absorbing colorant. In an example, the active material is a near-infrared light absorbing colorant. Any near-infrared colorants, e.g., those produced by Fabricolor, Eastman Kodak, or BASF, Yamamoto, may be used in the core fusing agent. As one example, the core fusing agent may be a printing liquid formulation including carbon black as the active material. Examples of this printing liquid formulation are commercially known as CM997A, 516458, C18928, C93848, C93808, or the like, all of which are available from HP Inc.

As another example, the core fusing agent may be a printing liquid formulation including near-infrared absorbing dyes as the active material. Examples of this printing liquid formulation are described in U.S. Pat. No. 9,133,344, incorporated herein by reference in its entirety. Some examples of the near-infrared absorbing dye are water-soluble near-infrared absorbing dyes selected from the group consisting of:

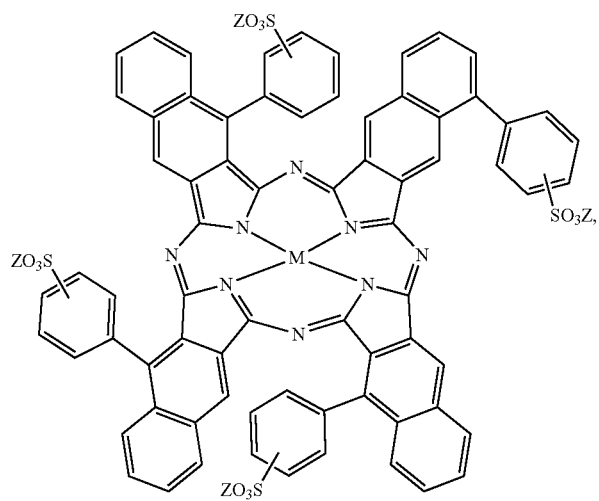
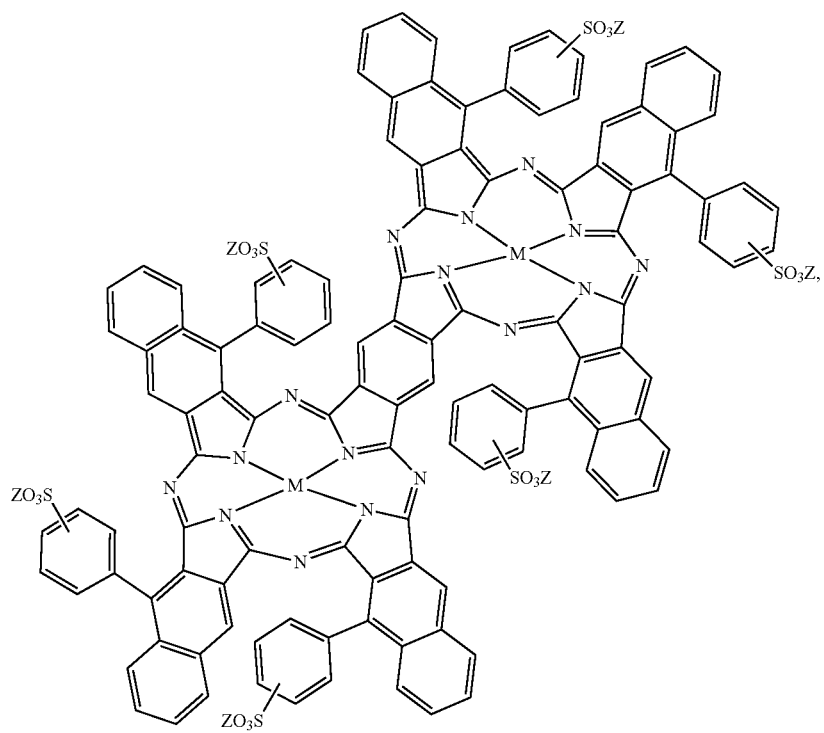

-continued

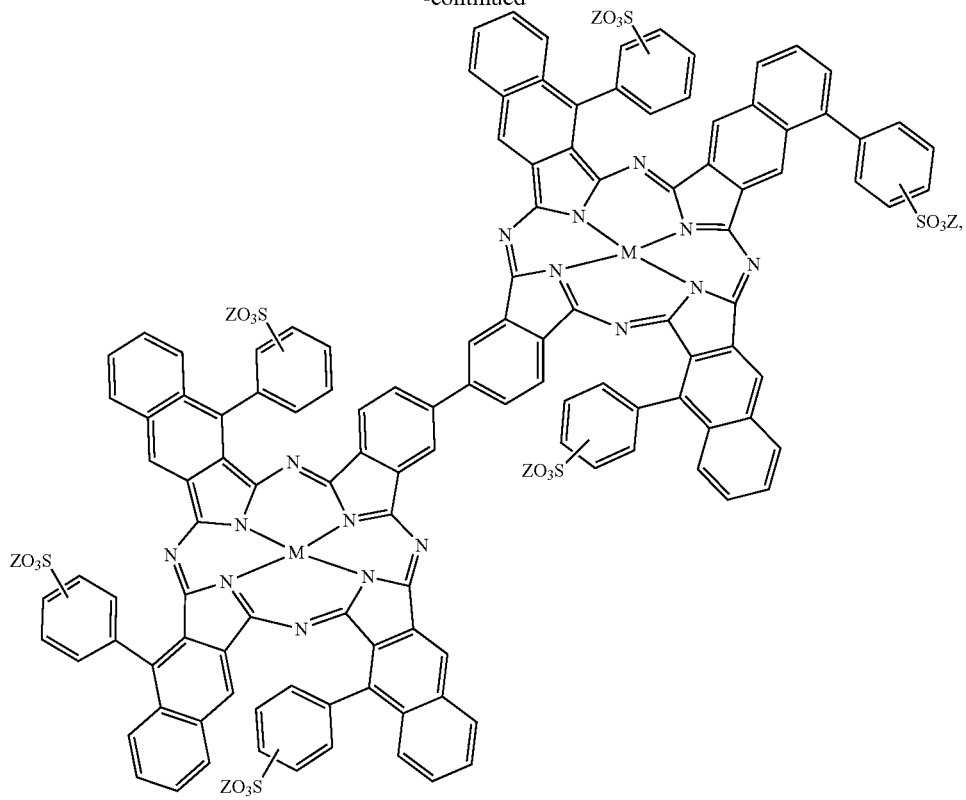

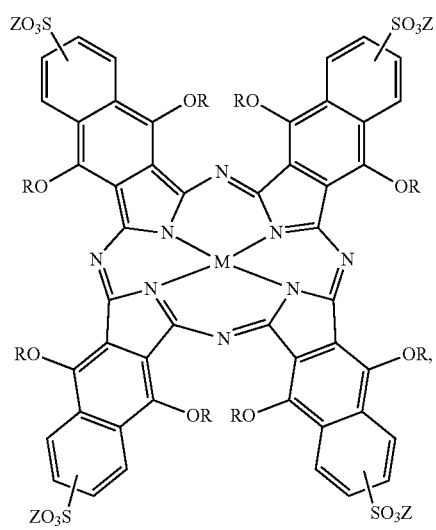

and mixtures thereof. In the above formulations, M can be a divalent metal atom (e.g., copper, etc.) or can have $OSO_3Na$ axial groups filling any unfilled valencies if the metal is more than divalent (e.g., indium, etc.), R can be hydrogen or any $C_1$-$C_8$ alkyl group (including substituted alkyl and unsubstituted alkyl), and Z can be a counterion such that the overall charge of the near-infrared absorbing dye is neutral. For example, the counterion can be sodium, lithium, potassium, $NH_4^+$, etc.

Some other examples of the near-infrared absorbing dye are hydrophobic near-infrared absorbing dyes selected from the group consisting of:

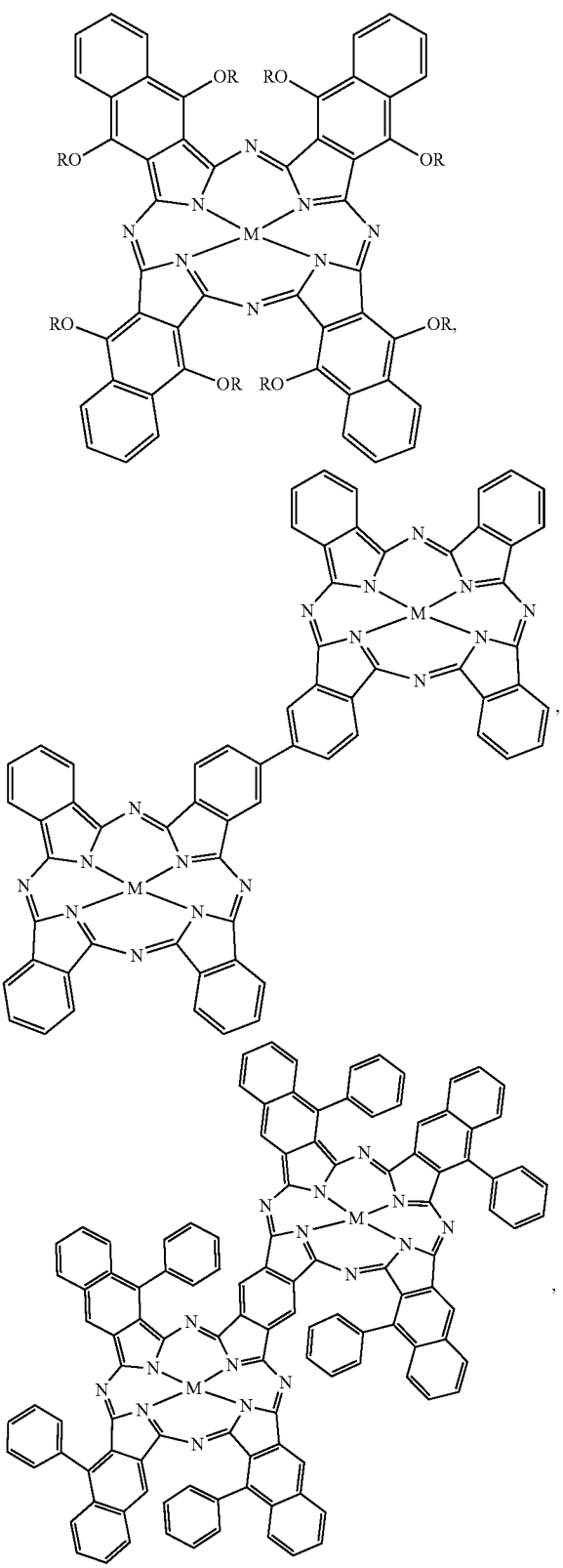

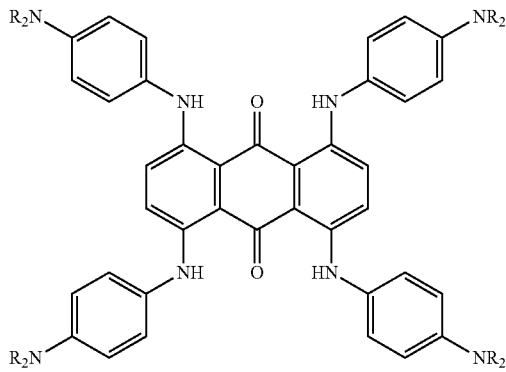

Anthroquinone dyes/pigments

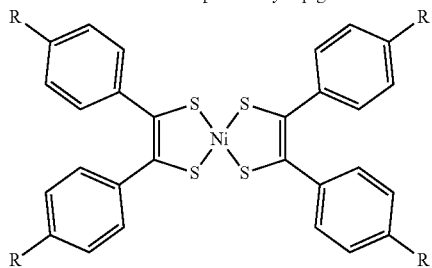

Nickel Dithiolene dyes/pigments and mixtures thereof. For the hydrophobic near-infrared absorbing dyes, M can be a divalent metal atom (e.g., copper, etc.) or can include a metal that has Cl, Br, or OR' (R'=H, $CH_3$, $COCH_3$, $COCH_2COOCH_3$, $COCH_2COCH_3$) axial groups filling any unfilled valencies if the metal is more than divalent, and R can be hydrogen or any $C_1$-$C_8$ alkyl group (including substituted alkyl and unsubstituted alkyl).

Other near-infrared absorbing dyes or pigments may be used in the core fusing agent. Some examples include anthroquinone dyes or pigments, metal dithiolene dyes or pigments, cyanine dyes or pigments, perylenediimide dyes or pigments, croconium dyes or pigments, pyrilium or thiopyrilium dyes or pigments, boron-dipyrromethene dyes or pigments, or aza-boron-dipyrromethene dyes or pigments.

Anthroquinone dyes or pigments and metal (e.g., nickel) dithiolene dyes or pigments may have the following structures, respectively:

where R in the anthroquinone dyes or pigments may be hydrogen or any $C_1$-$C_8$ alkyl group (including substituted alkyl and unsubstituted alkyl), and R in the dithiolene may be hydrogen, COOH, $SO_3$, $NH_2$, any $C_1$-$C_8$ alkyl group (including substituted alkyl and unsubstituted alkyl), or the like.

Cyanine dyes or pigments and perylenediimide dyes or pigments may have the following structures, respectively:

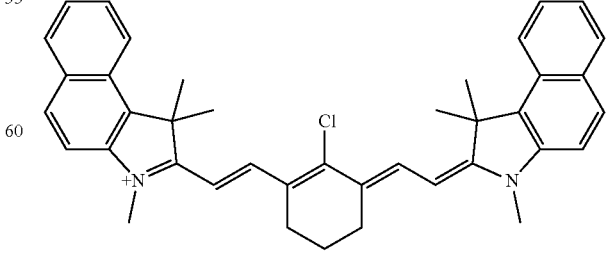

Cyanine dyes/pigments

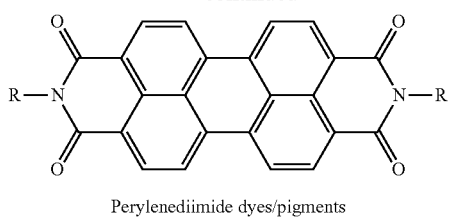

Perylenediimide dyes/pigments where R in the perylenediimide dyes or pigments may be hydrogen or any $C_1$-$C_8$ alkyl group (including substituted alkyl and unsubstituted alkyl).

Croconium dyes or pigments and pyrilium or thiopyrilium dyes or pigments may have the following structures, respectively:

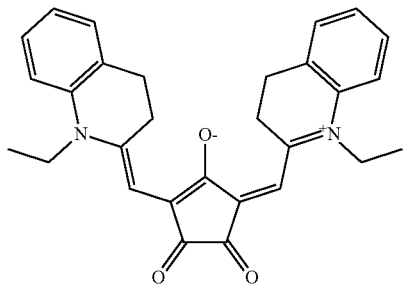

Croconium dyes/pigments

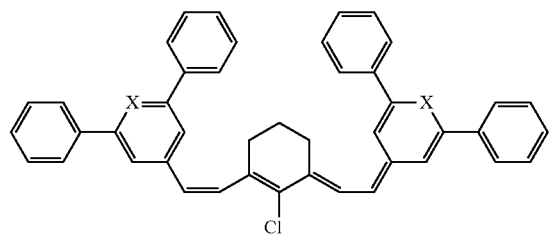

Pyrilium (X = O), thiopyrilium (X = S) dyes/pigments

Boron-dipyrromethene dyes or pigments and aza-boron-dipyrromethene dyes or pigments may have the following structures, respectively:

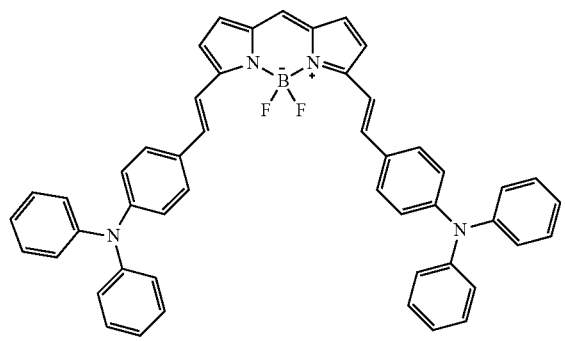

boron-dipyrromethene dyes/pigments

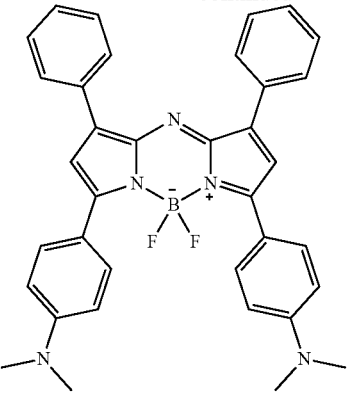

aza-boron-dipyrromethene dyes/pigments

Other suitable near-infrared absorbing dyes may include aminium dyes, tetraaryldiamine dyes, phthalocyanine dyes, and others.

Other suitable near-infrared absorbing dyes may include aminium dyes, tetraaryldiamine dyes, phthalocyanine dyes, and others.

Other near infrared absorbing materials include conjugated polymers (i.e., a polymer that has a backbone with alternating double and single bonds), such as poly(3,4-ethylenedioxythiophene)-poly(styrenesulfonate) (PEDOT: PSS), a polythiophene, poly(p-phenylene sulfide), a polyaniline, a poly(pyrrole), a poly(acetylene), poly(p-phenylene vinylene), polyparaphenylene, or combinations thereof.

The amount of the energy absorber/active material that is present in the core fusing agent ranges from greater than 0 wt % active to about 40 wt % active based on the total weight of the core fusing agent. In other examples, the amount of the active material in the core fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these active material loadings provide a balance between the core fusing agent having jetting reliability and heat and/or radiation absorbance efficiency.

Primer Fusing Agent

Some examples of the primer fusing agent are dispersions including the energy absorber that has absorption at wavelengths ranging from 800 nm to 4000 nm and transparency at wavelengths ranging from 400 nm to 780 nm. The absorption of this energy absorber is the result of plasmonic resonance effects. Electrons associated with the atoms of the energy absorber may be collectively excited by radiation, which results in collective oscillation of the electrons. The wavelengths that can excite and oscillate these electrons collectively are dependent on the number of electrons present in the energy absorber particles, which in turn is dependent on the size of the energy absorber particles. The amount of energy that can collectively oscillate the particle's electrons is low enough that very small particles (e.g., 1-100 nm) may absorb radiation with wavelengths several times (e.g., from 8 to 800 or more times) the size of the particles. The use of these particles allows the primer fusing agent to be inkjet jettable as well as electromagnetically selective (e.g., having absorption at wavelengths ranging from 800 nm to 4000 nm and transparency at wavelengths ranging from 400 nm to 780 nm).

In an example, the energy absorber of the primer fusing agent has an average particle diameter (e.g., volume-weighted mean diameter) ranging from greater than 0 nm to less than 220 nm. In another example, the energy absorber has an average particle diameter ranging from greater than 0 nm to 120 nm. In a still another example, the energy absorber has an average particle diameter ranging from about 10 nm to about 200 nm.

In an example, the energy absorber of the primer fusing agent is an inorganic pigment. Examples of suitable inorganic pigments include lanthanum hexaboride ($LaB_6$), tungsten bronzes ($A_xWO_3$), indium tin oxide ($In_2O_3$:$SnO_2$, ITO), antimony tin oxide ($Sb_2O_3$:$SnO_2$, ATO), titanium nitride (TiN), aluminum zinc oxide (AZO), ruthenium oxide ($RuO_2$), silver (Ag), gold (Au), platinum (Pt), iron pyroxenes ($A_xFe_ySi_2O_6$ wherein A is Ca or Mg, x=1.5-1.9, and y=0.1-0.5), modified iron phosphates ($A_xFe_yPO_4$), modified copper phosphates ($A_xCu_yPO_z$), and modified copper pyrophosphates ($A_xCu_yP_2O_7$). Tungsten bronzes may be alkali doped tungsten oxides. Examples of suitable alkali dopants (i.e., A in $A_xWO_3$) may be cesium, sodium, potassium, or rubidium. In an example, the alkali doped tungsten oxide may be doped in an amount ranging from greater than 0 mol % to about 0.33 mol % based on the total mol % of the alkali doped tungsten oxide. Suitable modified iron phosphates ($A_xFe_yPO$) may include copper iron phosphate (A=Cu, x=0.1-0.5, and y=0.5-0.9), magnesium iron phosphate (A=Mg, x=0.1-0.5, and y=0.5-0.9), and zinc iron phosphate (A=Zn, x=0.1-0.5, and y=0.5-0.9). For the modified iron phosphates, it is to be understood that the number of phosphates may change based on the charge balance with the cations. Suitable modified copper pyrophosphates ($A_xCu_yP_2O_7$) include iron copper pyrophosphate (A=Fe, x=0-2, and y=0-2), magnesium copper pyrophosphate (A=Mg, x=0-2, and y=0-2), and zinc copper pyrophosphate (A=Zn, x=0-2, and y=0-2). Combinations of the inorganic pigments may also be used.

The amount of the energy absorber that is present in the primer fusing agent ranges from greater than 0 wt % active to about 40 wt % active based on the total weight of the primer fusing agent. In other examples, the amount of the energy absorber in the primer fusing agent ranges from about 0.3 wt % active to 30 wt % active, from about 1 wt % active to about 20 wt % active, from about 1.0 wt % active up to about 10.0 wt % active, or from greater than 4.0 wt % active up to about 15.0 wt % active. It is believed that these energy absorber loadings provide a balance between the primer fusing agent having jetting reliability and heat and/or radiation absorbance efficiency.

The energy absorber of the primer fusing agent may, in some instances, be dispersed with a dispersant. As such, the dispersant helps to uniformly distribute the energy absorber throughout the primer fusing agent. Examples of suitable dispersants include polymer or small molecule dispersants, charged groups attached to the energy absorber surface, or other suitable dispersants. Some specific examples of suitable dispersants include a water-soluble acrylic acid polymer (e.g., CARBOSPERSE® K7028 available from Lubrizol), water-soluble styrene-acrylic acid copolymers/resins (e.g., JONCRYL® 296, JONCRYL® 671, JONCRYL® 678, JONCRYL® 680, JONCRYL® 683, JONCRYL® 690, etc. available from BASF Corp.), a high molecular weight block copolymer with pigment affinic groups (e.g., DISPERBYK®-190 available BYK Additives and Instruments), or water-soluble styrene-maleic anhydride copolymers/resins.

Whether a single dispersant is used or a combination of dispersants is used, the total amount of dispersant(s) in the primer fusing agent may range from about 10 wt % to about 200 wt % based on the weight of the energy absorber in the primer fusing agent.

A silane coupling agent may also be added to the primer fusing agent to help bond the organic (e.g., dispersant) and inorganic (e.g., pigment) materials. Examples of suitable silane coupling agents include the SILQUEST® A series manufactured by Momentive.

Whether a single silane coupling agent is used or a combination of silane coupling agents is used, the total amount of silane coupling agent(s) in the primer fusing agent may range from about 0.1 wt % to about 50 wt % based on the weight of the energy absorber in the primer fusing agent. In an example, the total amount of silane coupling agent(s) in the primer fusing agent ranges from about 1 wt % to about 30 wt % based on the weight of the energy absorber. In another example, the total amount of silane coupling agent(s) in the primer fusing agent ranges from about 2.5 wt % to about 25 wt % based on the weight of the energy absorber.

One example of the primer fusing agent includes cesium tungsten oxide (CTO) nanoparticles as the energy absorber. The CTO nanoparticles have a formula of $Cs_xWO_3$, where $0<x<1$. The cesium tungsten oxide nanoparticles may give the primer fusing agent a light blue color. The strength of the color may depend, at least in part, on the amount of the CTO nanoparticles in the primer fusing agent. When it is desirable to form an outer white layer on the 3D object, less of the CTO nanoparticles may be used in the primer fusing agent in order to achieve the white color. In an example, the CTO nanoparticles may be present in the primer fusing agent in an amount ranging from about 1 wt % to about 20 wt % (based on the total weight of the primer fusing agent).

The average particle size (e.g., volume-weighted mean diameter) of the CTO nanoparticles may range from about 1 nm to about 40 nm. In some examples, the average particle size of the CTO nanoparticles may range from about 1 nm to about 15 nm or from about 1 nm to about 10 nm. The upper end of the particle size range (e.g., from about 30 nm to about 40 nm) may be less desirable, as these particles may be more difficult to stabilize.

This example of the primer fusing agent may also include a zwitterionic stabilizer. The zwitterionic stabilizer may improve the stabilization of this example of the primer fusing agent. While the zwitterionic stabilizer has an overall neutral charge, at least one area of the molecule has a positive charge (e.g., amino groups) and at least one other area of the molecule has a negative charge. The CTO nanoparticles may have a slight negative charge. The zwitterionic stabilizer molecules may orient around the slightly negative CTO nanoparticles with the positive area of the zwitterionic stabilizer molecules closest to the CTO nanoparticles and the negative area of the zwitterionic stabilizer molecules furthest away from the CTO nanoparticles. Then, the negative charge of the negative area of the zwitterionic stabilizer molecules may repel CTO nanoparticles from each other. The zwitterionic stabilizer molecules may form a protective layer around the CTO nanoparticles, and prevent them from coming into direct contact with each other and/or increase the distance between the particle surfaces (e.g., by a distance ranging from about 1 nm to about 2 nm). Thus, the zwitterionic stabilizer may prevent the CTO nanoparticles from agglomerating and/or settling in the primer fusing agent.

Examples of suitable zwitterionic stabilizers include $C_2$ to $C_8$ betaines, $C_2$ to $C_8$ aminocarboxylic acids having a solubility of at least 10 g in 100 g of water, taurine, and combinations thereof. Examples of the $C_2$ to $C_8$ aminocarboxylic acids include beta-alanine, gamma-aminobutyric acid, glycine, and combinations thereof.

The zwitterionic stabilizer may be present in the primer fusing agent in an amount ranging from about 2 wt % to about 35 wt % (based on the total weight of the primer fusing agent). When the zwitterionic stabilizer is the $C_2$ to $C_8$ betaine, the $C_2$ to $C_8$ betaine may be present in an amount ranging from about 8 wt % to about 35 wt % of the total weight of the primer fusing agent. When the zwitterionic stabilizer is the $C_2$ to $C_8$ aminocarboxylic acid, the $C_2$ to $C_8$ aminocarboxylic acid may be present in an amount ranging from about 2 wt % to about 20 wt % of the total weight of the primer fusing agent. When the zwitterionic stabilizer is taurine, taurine may be present in an amount ranging from about 2 wt % to about 35 wt % of the total weight of the primer fusing agent.

In this example, the weight ratio of the CTO nanoparticles to the zwitterionic stabilizer may range from 1:10 to 10:1; or the weight ratio of the CTO nanoparticles to the zwitterionic stabilizer may be 1:1.

Vehicle for Fusing Agents

Any example of the fusing agent (core or primer fusing agent) includes a liquid vehicle. The fusing agent vehicle, or "FA vehicle," may refer to the liquid in which the energy absorber is/are dispersed or dissolved to form the respective fusing agent. A wide variety of FA vehicles, including aqueous and non-aqueous vehicles, may be used in the fusing agents. In some examples, the FA vehicle may include water alone or a non-aqueous solvent alone with no other components. In other examples, the FA vehicle may include other components, depending, in part, upon the applicator that is to be used to dispense the fusing agent. Examples of other suitable fusing agent components include co-solvent(s), humectant(s), surfactant(s), antimicrobial agent(s), anti-kogation agent(s), and/or chelating agent(s).

It is to be understood that any of the include co-solvent(s), surfactant(s), humectant(s), anti-kogation agent(s), antimicrobial agent(s), and/or chelating agent(s) described herein for the hydrophobic agent may be used in any examples of the fusing agent in any of the amounts provided, except that the percentages will be with respect to the total weight of the fusing agent.

The balance of the fusing agent(s) is water (e.g., deionized water, purified water, etc.), which as described herein, may vary depending upon the other components in the fusing agent(s).

Detailing Agent

Some examples of the multi-fluid kit and/or 3D printing kit include a detailing agent. The detailing agent may include a surfactant, a co-solvent, and a balance of water. In some examples, the detailing agent consists of these components, and no other components. In some other examples, the detailing agent may further include a colorant. In still some other examples, detailing agent consists of a colorant, a surfactant, a co-solvent, and a balance of water, with no other components. In yet some other examples, the detailing agent may further include additional components, such as anti-kogation agent(s), antimicrobial agent(s), and/or chelating agent(s) (each of which is described above in reference to the hydrophobic agent).

The surfactant(s) that may be used in the detailing agent include any one or combination of surfactants listed herein in reference to the hydrophobic agent. The total amount of surfactant(s) in the detailing agent may range from about 0.10 wt % active to about 5.00 wt % active with respect to the total weight of the detailing agent.

The co-solvent(s) that may be used in the detailing agent include any of the co-solvents listed above in reference to the hydrophobic agent. The total amount of co-solvent(s) in the detailing agent may range from about 1.00 wt % to about 65.00 wt % with respect to the total weight of the detailing agent.

In some examples, the detailing agent does not include a colorant. In these examples, the detailing agent may be colorless. As used herein, "colorless," means that the detailing agent is achromatic and does not include a colorant.

When the detailing agent includes the colorant, the colorant may be a dye of any color having substantially no absorbance in a range of 650 nm to 2500 nm. By "substantially no absorbance" it is meant that the dye absorbs no radiation having wavelengths in a range of 650 nm to 2500 nm, or that the dye absorbs less than 10% of radiation having wavelengths in a range of 650 nm to 2500 nm. The dye may also be capable of absorbing radiation with wavelengths of 650 nm or less. As such, the dye absorbs at least some wavelengths within the visible spectrum, but absorbs little or no wavelengths within the near-infrared spectrum. This is in contrast to the active (energy absorbing) material in the fusing agent, which absorbs wavelengths within the near-infrared spectrum. As such, the colorant in the detailing agent will not substantially absorb the fusing radiation, and thus will not initiate melting and fusing (coalescence) of the build material composition in contact therewith when the build material layer is exposed to the energy.

It may be desirable to add color to the detailing agent when the detailing agent is applied to the edge of a colored part. Color in the detailing agent may be desirable when used at a part edge because some of the colorant may become embedded in the build material 24 that fuses/coalesces at the edge. As such, in some examples, the dye in the detailing agent may be selected so that its color matches the color of the active material in the fusing agent. As examples, the dye may be any azo dye having sodium or potassium counter ion(s) or any diazo (i.e., double azo) dye having sodium or potassium counter ion(s), where the color of azo or dye azo dye matches the color of the fusing agent.

In an example, the dye is a black dye. Some examples of the black dye include azo dyes having sodium or potassium counter ion(s) and diazo (i.e., double azo) dyes having sodium or potassium counter ion(s). Examples of azo and diazo dyes may include tetrasodium (6Z)-4-acetamido-5-oxo-6-[[7-sulfonato-4-(4-sulfonatophenyl)azo-1-naphthyl]hydrazono]naphthalene-1,7-disulfonate with a chemical structure of:

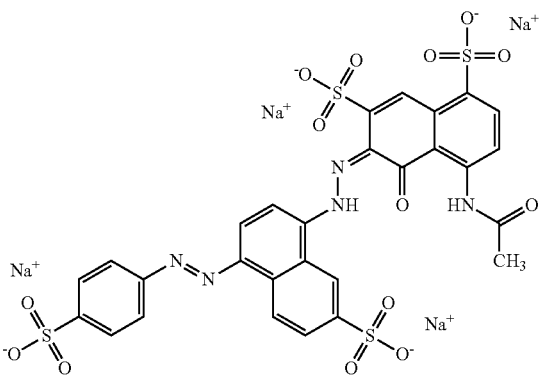

(commercially available as Food Black 1), tetrasodium 6-amino-4-hydroxy-3-[[7-sulfonato-4-[(4-sulfonatophenyl)azo]-1-naphthyl]azo]naphthalene-2,7-disulfonate with a chemical structure of:

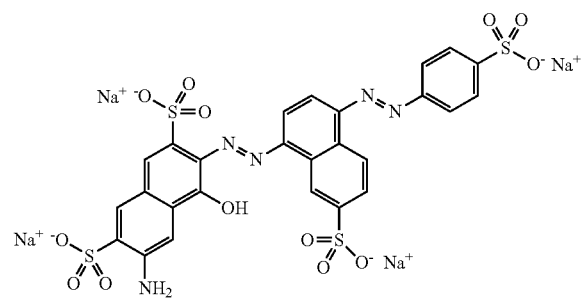

(commercially available as Food Black 2); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

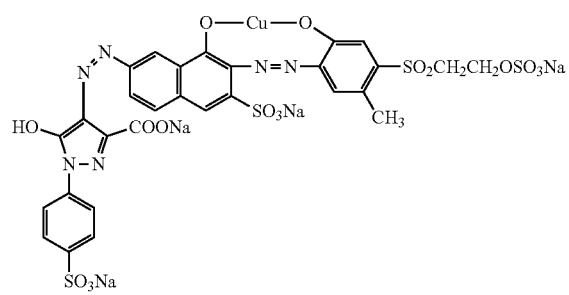

(commercially available as Reactive Black 31); tetrasodium (6E)-4-amino-5-oxo-3-[[4-(2-sulfonatooxyethylsulfonyl)phenyl]diazenyl]-6-[[4-(2-sulfonatooxyethylsulfonyl)phenyl]hydrazinylidene]naphthalene-2,7-disulfonate with a chemical structure of:

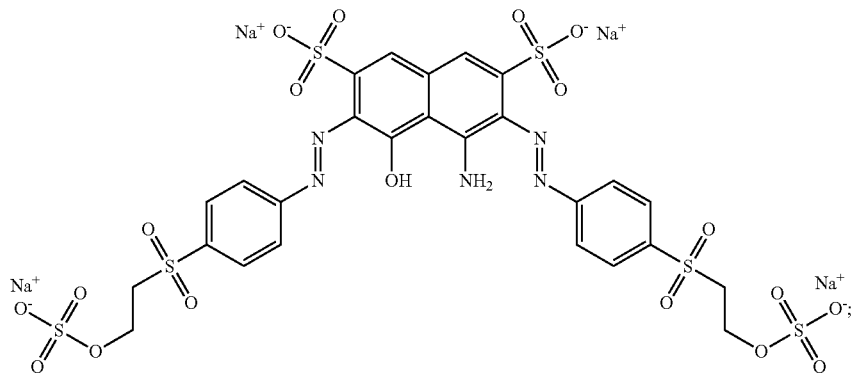

and combinations thereof. Some other commercially available examples of the dye used in the detailing agent include multipurpose black azo-dye based liquids, such as PRO-JET® Fast Black 1 (made available by Fujifilm Holdings), and black azo-dye based liquids with enhanced water fastness, such as PRO-JET® Fast Black 2 (made available by Fujifilm Holdings).

In some instances, in addition to the black dye, the colorant in the detailing agent may further include another dye. In an example, the other dye may be a cyan dye that is used in combination with any of the dyes disclosed herein. The other dye may also have substantially no absorbance above 650 nm. The other dye may be any colored dye that contributes to improving the hue and color uniformity of the final 3D part.

Some examples of the other dye include a salt, such as a sodium salt, an ammonium salt, or a potassium salt. Some specific examples include ethyl-[4-[[4-[ethyl-[(3-sulfophenyl) methyl] amino] phenyl]-(2-sulfophenyl) ethylidene]-1-cyclohexa-2,5-dienylidene]-[(3-sulfophenyl) methyl] azanium with a chemical structure of:

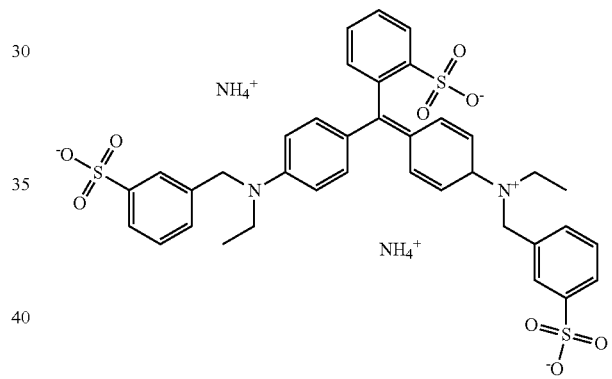

(commercially available as Acid Blue 9, where the counter ion may alternatively be sodium counter ions or potassium counter ions); sodium 4-[(E)-{4-[benzyl(ethyl)amino]phenyl}{(4E)-4-[benzyl(ethyl)iminio]cyclohexa-2,5-dien-1-ylidene}methyl]benzene-1,3-disulfonate with a chemical structure of:

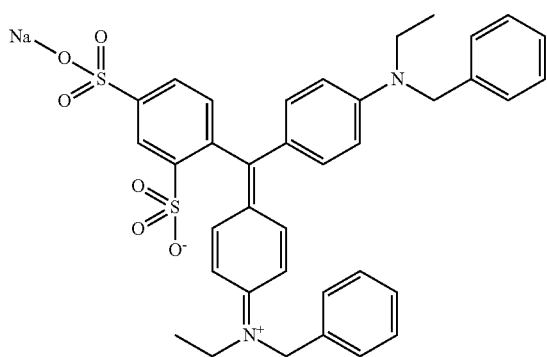

(commercially available as Acid Blue 7); and a phthalocyanine with a chemical structure of:

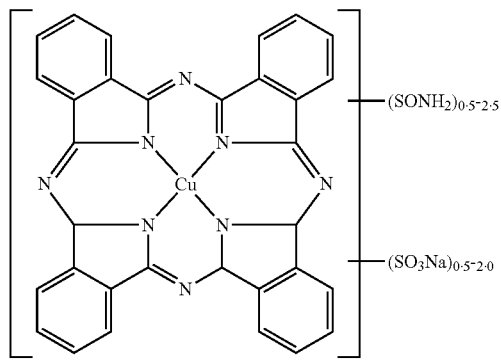

(commercially available as Direct Blue 199); and combinations thereof.

In an example of the detailing agent, the dye may be present in an amount ranging from about 1.00 wt % active to about 3.00 wt % active based on the total weight of the detailing agent. In another example of the detailing agent including a combination of dyes, one dye (e.g., the black dye) is present in an amount ranging from about 1.50 wt % active to about 1.75 wt % active based on the total weight of the detailing agent, and the other dye (e.g., the cyan dye) is present in an amount ranging from about 0.25 wt % active to about 0.50 wt % active based on the total weight of the detailing agent.

The balance of the detailing agent is water. As such, the amount of water may vary depending upon the amounts of the other components that are included.

Coloring Agent

Some examples of the multi-fluid kit and/or 3D printing kit include a coloring agent. The coloring agent may include a colorant, a co-solvent, and a balance of water. In some examples, the coloring agent consists of these components, and no other components. In some other examples, the coloring agent may further include a binder (e.g., an acrylic latex binder, which may be a copolymer of any two or more of styrene, acrylic acid, methacrylic acid, methyl methacrylate, ethyl methacrylate, and butyl methacrylate) and/or a buffer. In still other examples, the coloring agent may further include additional components, such as dispersant(s), humectant(s), surfactant(s), anti-kogation agent(s), antimicrobial agent(s), and/or chelating agent(s) (each of which is described herein in reference to the hydrophobic agent and/or fusing agents).

The coloring agent may be a black agent, a cyan agent, a magenta agent, or a yellow agent. As such, the colorant may be a black colorant, a cyan colorant, a magenta colorant, a yellow colorant, or a combination of colorants that together achieve a black, cyan, magenta, or yellow color.

In some instances, the colorant of the coloring agent may be transparent to infrared wavelengths. In other instances, the colorant of the coloring agent may not be completely transparent to infrared wavelengths, but does not absorb enough radiation to sufficiently heat the build material composition in contact therewith. In an example, the colorant absorbs less than 10% of radiation having wavelengths in a range of 650 nm to 2500 nm. In another example, the colorant absorbs less than 20% of radiation having wavelengths in a range of 650 nm to 4000 nm.

The colorant of the coloring agent is also capable of absorbing radiation with wavelengths of 650 nm or less. As such, the colorant absorbs at least some wavelengths within the visible spectrum, but absorbs little or no wavelengths within the near-infrared spectrum. This is in contrast to at least some examples of the energy absorber in the fusing agent, which absorbs wavelengths within the near-infrared spectrum and/or the infrared spectrum. As such, the colorant in the coloring agent will not substantially absorb the fusing radiation, and thus will not initiate coalescing/fusing of the build material composition in contact therewith when the build material composition is exposed to energy.

Examples of IR transparent colorants include acid yellow 23 (AY 23), AY17, acid red 52 (AR 52), AR 289, and reactive red 180 (RR 180). Examples of colorants that absorb some visible wavelengths and some IR wavelengths include cyan colorants, such as direct blue 199 (DB 199) and pigment blue 15:3 (PB 15:3).

In other examples, the colorant may be any azo dye having sodium or potassium counter ion(s) or any diazo (i.e., double azo) dye having sodium or potassium counter ion(s), such as those described herein for the detailing agent.

An example of the pigment based coloring agent may include from about 1 wt % to about 10 wt % of pigment(s), from about 10 wt % to about 30 wt % of co-solvent(s), from about 1 wt % to about 10 wt % of dispersant(s), from about 0.1 wt % to about 5 wt % of binder(s), from 0.01 wt % to about 1 wt % of anti-kogation agent(s), from about 0.05 wt % to about 0.1 wt % antimicrobial agent(s), and a balance of water. An example of the dye based coloring agent may include from about 1 wt % to about 7 wt % of dye(s), from about 10 wt % to about 30 wt % of co-solvent(s), from about 1 wt % to about 7 wt % of dispersant(s), from about 0.05 wt % to about 0.1 wt % antimicrobial agent(s), from 0.05 wt % to about 0.1 wt % of chelating agent(s), from about 0.005 wt % to about 0.2 wt % of buffer(s), and a balance of water.

Some examples of the coloring agent include a set of cyan, magenta, and yellow agents, such as C1893A (cyan), C1984A (magenta), and C1985A (yellow); or C4801A (cyan), C4802A (magenta), and C4803A (yellow); all of which are available from HP Inc. Other commercially available coloring agents 18 include C9384A (printhead HP 72), C9383A (printhead HP 72), C4901A (printhead HP 940), and C4900A (printhead HP 940).

Build Material Composition

The build material composition includes a polymeric build material. Examples of suitable polymeric materials include a polyamide (PAs) (e.g., PA 11/nylon 11, PA 12/nylon 12, PA 6/nylon 6, PA 8/nylon 8, PA 9/nylon 9, PA 66/nylon 66, PA 612/nylon 612, PA 812/nylon 812, PA 912/nylon 912, etc.), a thermoplastic polyamide (TPA), a thermoplastic polyurethane (TPU), a styrenic block copolymer (TPS), a thermoplastic polyolefin elastomer (TPO), a thermoplastic vulcanizate (TPV), thermoplastic copolyester (TPC), a polyether block amide (PEBA), and a combination thereof.

In some examples, the polymeric build material may be in the form of a powder. In other examples, the polymeric build material may be in the form of a powder-like material, which includes, for example, short fibers having a length that is greater than its width. In some examples, the powder or powder-like material may be formed from, or may include, short fibers that may, for example, have been cut into short lengths from long strands or threads of material.

The polymeric build material may be made up of similarly sized particles and/or differently sized particles. In an example, the average particle size of the polymeric build material ranges from about 2 μm to about 225 μm. In another example, the average particle size of the polymeric build material 16 ranges from about 10 μm to about 130 μm. The term "average particle size", as used herein, may refer to a number-weighted mean diameter or a volume-weighted mean diameter of a particle distribution.

When the polymeric build material is a polyamide, the polymer may have a wide processing window of greater than 5° C., which can be defined by the temperature range between the melting point and the re-crystallization temperature. In an example, the polymer may have a melting point ranging from about 50° C. to about 300° C. As other examples, the polymer may have a melting point ranging from about 155° C. to about 225° C., from about 155° C. to about 215° C., about 160° C. to about 200° C., from about 170° C. to about 190° C., or from about 182° C. to about 189° C. As still another example, the polymer may be a polyamide having a melting point of about 180° C.

When the polymeric build material is a thermoplastic elastomer, the thermoplastic elastomer may have a melting range within the range of from about 130° C. to about 250° C. In some examples (e.g., when the thermoplastic elastomer is a polyether block amide), the thermoplastic elastomer may have a melting range of from about 130° C. to about 175° C. In some other examples (e.g., when the thermoplastic elastomer is a thermoplastic polyurethane), the thermoplastic elastomer may have a melting range of from about 130° C. to about 180° C. or a melting range of from about 175° C. to about 210° C.

In some examples, the polymeric build material does not substantially absorb radiation having a wavelength within the range of 300 nm to 1400 nm. The phrase "does not substantially absorb" means that the absorptivity of the thermoplastic elastomer at a particular wavelength is 25% or less (e.g., 20%, 10%, 5%, etc.)

In some examples, in addition to the polymeric build material, the build material composition may include an antioxidant, a whitener, an antistatic agent, a flow aid, or a combination thereof. While several examples of these additives are provided, it is to be understood that these additives are selected to be thermally stable (i.e., will not decompose) at the 3D printing temperatures.

Antioxidant(s) may be added to the build material composition to prevent or slow molecular weight decreases of the polymeric build material and/or to prevent or slow discoloration (e.g., yellowing) of the polymeric build material by preventing or slowing oxidation of the polymeric build material. In some examples, the polymeric material may discolor upon reacting with oxygen, and this discoloration may contribute to the discoloration of the build material composition. The antioxidant may be selected to minimize discoloration. In some examples, the antioxidant may be a radical scavenger. In these examples, the antioxidant may include IRGANOX® 1098 (benzenepropanamide, N,N'-1,6-hexanediylbis(3,5-bis(1,1-dimethylethyl)-4-hydroxy)), IRGANOX® 254 (a mixture of 40% triethylene glycol bis(3-tert-butyl-4-hydroxy-5-methylphenyl), polyvinyl alcohol and deionized water), and/or other sterically hindered phenols. In other examples, the antioxidant may include a phosphite and/or an organic sulfide (e.g., a thioester). The antioxidant may be in the form of fine particles (e.g., having an average particle size of 5 μm or less) that are dry blended with the polymeric build material. In an example, the antioxidant may be included in the build material composition in an amount ranging from about 0.01 wt % to about 5 wt %, based on the total weight of the build material composition. In other examples, the antioxidant may be included in the build material composition in an amount ranging from about 0.01 wt % to about 2 wt % or from about 0.2 wt % to about 1 wt %, based on the total weight of the build material composition.

Whitener(s) may be added to the build material composition to improve visibility. Examples of suitable whiteners include titanium dioxide ($TiO_2$), zinc oxide (ZnO), calcium carbonate ($CaCO_3$), zirconium dioxide ($ZrO_2$), aluminum oxide ($Al_2O_3$), silicon dioxide ($SiO_2$), boron nitride (BN), and combinations thereof. In some examples, a stilbene derivative may be used as the whitener and a brightener. In these examples, the temperature(s) of the 3D printing process may be selected so that the stilbene derivative remains stable (i.e., the 3D printing temperature does not thermally decompose the stilbene derivative). In an example, any example of the whitener may be included in the build material composition in an amount ranging from greater than 0 wt % to about 10 wt %, based on the total weight of the build material composition.

Antistatic agent(s) may be added to the build material composition to suppress tribo-charging. Examples of suitable antistatic agents include aliphatic amines (which may be ethoxylated), aliphatic amides, quaternary ammonium salts (e.g., behentrimonium chloride or cocamidopropyl betaine), esters of phosphoric acid, polyethylene glycolesters, or polyols. Some suitable commercially available antistatic agents include HOSTASTAT® FA 38 (natural based ethoxylated alkylamine), HOSTASTAT® FE2 (fatty acid ester), and HOSTASTAT® HS 1 (alkane sulfonate), each of which is available from Clariant Int. Ltd.). In an example, the antistatic agent is added in an amount ranging from greater than 0 wt % to less than 5 wt %, based upon the total weight of the build material composition.

Flow aid(s) may be added to improve the coating flowability of the build material composition. Flow aids may be particularly beneficial when the build material composition has an average particle size less than 25 μm. The flow aid improves the flowability of the build material composition by reducing the friction, the lateral drag, and the tribocharge buildup (by increasing the particle conductivity). Examples of suitable flow aids include aluminum oxide ($Al_2O_3$), tricalcium phosphate (E341), powdered cellulose (E460(ii)), magnesium stearate (E470b), sodium bicarbonate (E500), sodium ferrocyanide (E535), potassium ferrocyanide (E536), calcium ferrocyanide (E538), bone phosphate (E542), sodium silicate (E550), silicon dioxide (E551), calcium silicate (E552), magnesium trisilicate (E553a), talcum powder (E553b), sodium aluminosilicate (E554), potassium aluminum silicate (E555), calcium aluminosilicate (E556), bentonite (E558), aluminum silicate (E559), stearic acid (E570), and polydimethylsiloxane (E900). In an example, the flow aid is added in an amount ranging from greater than 0 wt % to less than 5 wt %, based upon the total weight of the build material composition.

Printing Methods and Methods of Use

Different examples of the 3D printing method are shown and described in reference to FIG. 2 through FIG. 7.

Prior to execution of any examples of the method, it is to be understood that a controller may access data stored in a data store pertaining to a 3D part/object that is to be printed. For example, the controller may determine the number of layers of the build material composition that are to be formed, the locations at which any of the agents is/are to be deposited on each of the respective layers, etc.

Printing with the Hydrophobic Agent and One Fusing Agent

Figure 2:
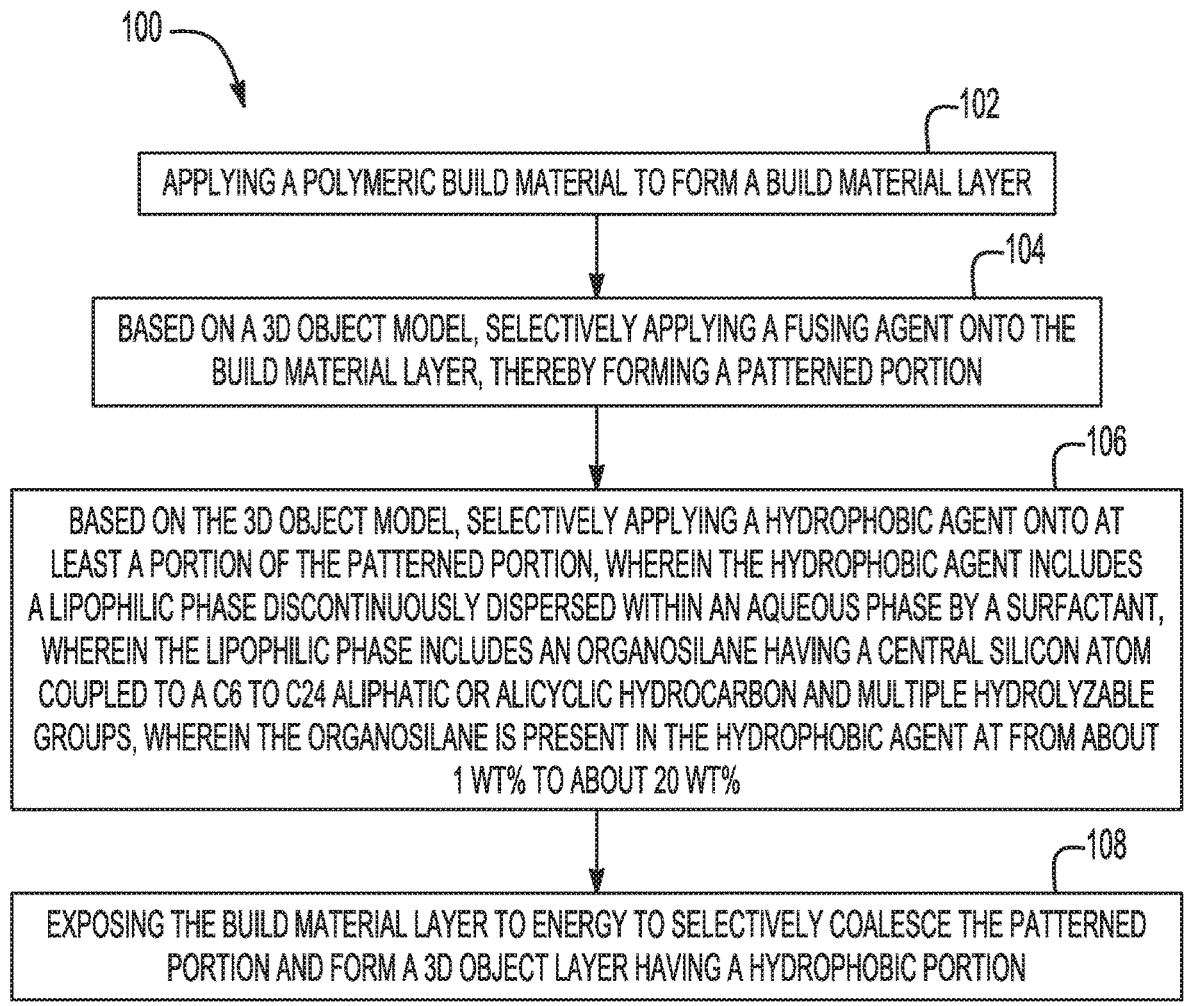
FIG. 2 is a flow diagram depicting an example of a 3D printing method.
Figure 3:
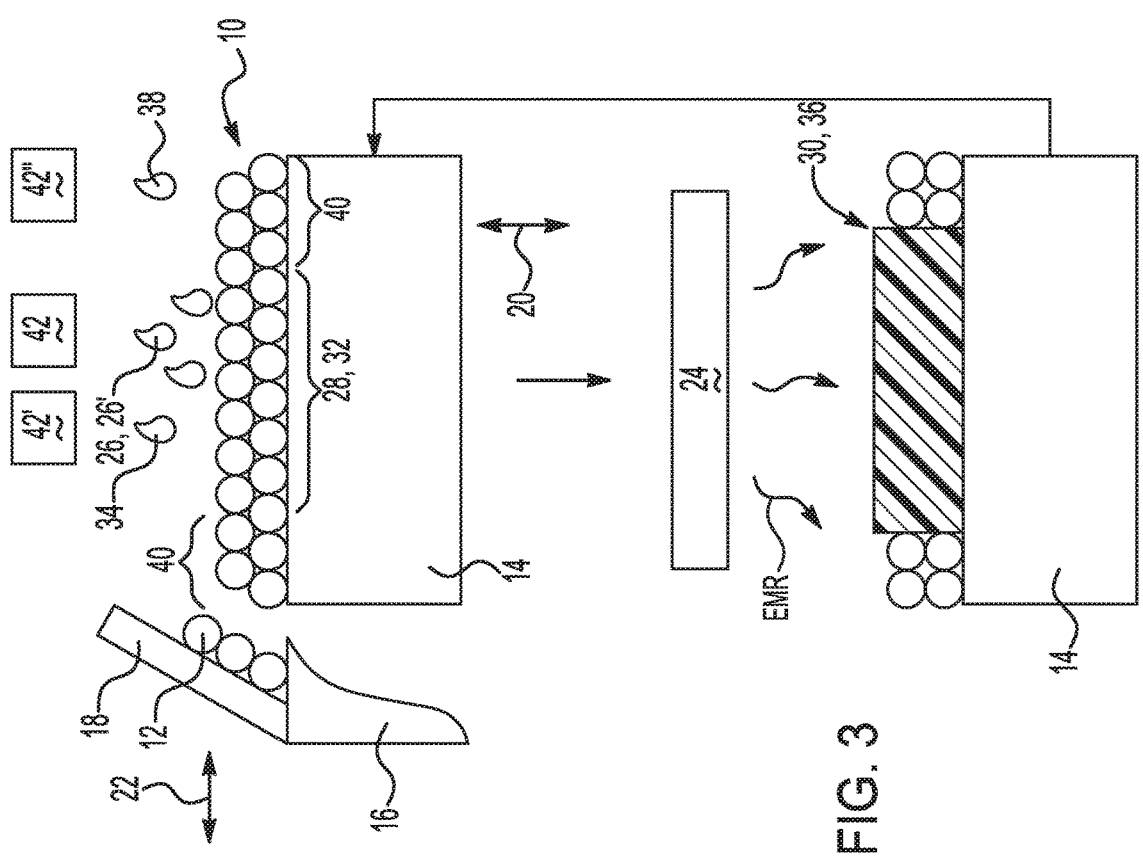
FIG. 3 is a schematic illustration of one example of the 3D printing method of FIG. 2.

Referring now to FIG. 2 and FIG. 3, an example of the method 100 which utilizes the hydrophobic agent and one of the fusing agents is depicted.

The method 100 shown in FIG. 2 includes applying a polymeric build material to form a build material layer (reference numeral 102); based on a 3D object model, selectively applying a fusing agent onto the build material layer, thereby forming a patterned portion (reference numeral 104); based on the 3D object model, selectively applying a hydrophobic agent onto at least a portion of the patterned portion, wherein the hydrophobic agent comprises a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt % (reference numeral 106); and exposing the build material layer to energy to selectively coalesce the patterned portion and form a 3D object layer having a hydrophobic portion (reference numeral 108).

The method 100 is shown schematically in FIG. 3. In FIG. 3, a layer 10 of the build material composition 12 is applied on a build area platform 14. A printing system may be used to apply the build material composition 12. The printing system may include the build area platform 14, a build material supply 16 containing the build material composition 12, and a build material distributor 18.

The build area platform 14 receives the build material composition 12 from the build material supply 16. The build area platform 14 may be moved in the directions as denoted by the arrow 20, e.g., along the z-axis, so that the build material composition 12 may be delivered to the build area platform 14 or to a previously formed layer. In an example, when the build material composition 12 is to be delivered, the build area platform 14 may be programmed to advance (e.g., downward) enough so that the build material distributor 18 can push the build material composition 12 onto the build area platform 14 to form a substantially uniform layer 10 of the build material composition 12 thereon. The build area platform 14 may also be returned to its original position, for example, when a new part is to be built.

The build material supply 16 may be a container, bed, or other surface that is to position the build material composition 12 between the build material distributor 18 and the build area platform 14. The build material supply 16 may include heaters so that the build material composition 12 is heated to a supply temperature ranging from about 25° C. to about 150° C. In these examples, the supply temperature may depend, in part, on the build material composition 12 used and/or the 3D printer used. As such, the range provided is one example, and higher or lower temperatures may be used.

The build material distributor 18 may be moved in the directions as denoted by the arrow 22, e.g., along the y-axis, over the build material supply 16 and across the build area platform 14 to spread the layer 10 of the build material composition 12 over the build area platform 14. The build material distributor 18 may also be returned to a position adjacent to the build material supply 16 following the spreading of the build material composition 12. The build material distributor 18 may be a blade (e.g., a doctor blade), a roller, a combination of a roller and a blade, and/or any other device capable of spreading the build material composition 12 over the build area platform 14. For instance, the build material distributor 18 may be a counter-rotating roller. In some examples, the build material supply 16 or a portion of the build material supply 16 may translate along with the build material distributor 18 such that build material composition 12 is delivered continuously to the build area platform 14 rather than being supplied from a single location at the side of the printing system as depicted in FIG. 3.

The build material supply 16 may supply the build material composition 12 into a position so that it is ready to be spread onto the build area platform 14. The build material distributor 18 may spread the supplied build material composition 12 onto the build area platform 14. The controller (not shown) may process "control build material supply" data, and in response, control the build material supply 16 to appropriately position the particles of the build material composition 12, and may process "control spreader" data, and in response, control the build material distributor 18 to spread the build material composition 12 over the build area platform 14 to form the layer 10 of the build material composition 12 thereon. In FIG. 3, one build material layer 10 has been formed.

The layer 10 has a substantially uniform thickness across the build area platform 14. In an example, the build material layer 10 has a thickness ranging from about 50 μm to about 120 μm. In another example, the thickness of the build material layer 26 ranges from about 30 μm to about 300 μm. It is to be understood that thinner or thicker layers may also be used. For example, the thickness of the build material layer 10 may range from about 20 μm to about 500 μm. The layer thickness may be about 2× (i.e., 2 times) the average diameter of the build material composition particles at a minimum for finer part definition. In some examples, the layer thickness may be about 1.2× the average diameter of the build material composition particles.

After the build material composition 12 has been applied, and prior to further processing, the build material layer 10 may be exposed to heating. In an example, the heating temperature may be below the melting point or melting range of the polymeric material of the build material composition 12. As examples, the pre-heating temperature may range from about 5° C. to about 50° C. below the melting point or the lowest temperature of the melting range of the polymeric material. In an example, the pre-heating temperature ranges from about 50° C. to about 205° C. In still another example, the pre-heating temperature ranges from about 100° C. to about 190° C. It is to be understood that the pre-heating temperature may depend, in part, on the build material composition 12 used. As such, the ranges provided are some examples, and higher or lower temperatures may be used.

Pre-heating the layer 10 may be accomplished by using any suitable heat source that exposes all of the build material composition 12 in the layer 10 to the heat. Examples of the heat source include a thermal heat source (e.g., a heater (not shown) integrated into the build area platform 14 (which may include sidewalls)) or a radiation source 24.

After the layer 10 is formed, and in some instances is pre-heated, the fusing agent(s) 26 or 26' is selectively applied on at least some of the build material composition 12 in the layer 10 to form a patterned portion 28.

To form a layer 30 of a 3D object, at least a portion (e.g., patterned portion 28) of the layer 10 of the build material composition 12 is patterned with the fusing agent 26, 26'. Either fusing agent 26 or 26' may be used. When it is desirable to form a white, colored, or slightly tinted object layer 30, the primer fusing agent 26' may be used to pattern the build material composition 12. The primer fusing agent 26' is clear or slightly tinted, and thus the resulting 3D object layer 30 may appear white or the color of the build material composition 12. When it is desirable to form a darker color or black object layer 30, the core fusing agent 26 may be used. The core fusing agent 26 is dark or black, and thus the resulting 3D object layer 30 may appear grey, black or another dark color. In other examples of the method (e.g., see FIG. 4) the two fusing agents 26, 26' may be used to pattern different portions of a single build material layer 10. Color may also be added by using the coloring agent (not shown), which will also be described further in reference to FIG. 5.

The volume of the fusing agent 26, 26' that is applied per unit of the build material composition 12 in the patterned portion 28 may be sufficient to absorb and convert enough electromagnetic radiation so that the build material composition 12 in the patterned portion 28 will coalesce/fuse. The volume of the fusing agent 26, 26' that is applied per unit of the build material composition 12 may depend, at least in part, on the energy absorber used, the energy absorber loading in the fusing agent 26, 26', and the build material composition 12 used.

To increase the hydrophobicity of at least a portion of the layer 30 of the 3D object, corresponding portion(s) 32 of the patterned portion 28 is/are also patterned with the hydrophobic agent 34. The hydrophobic agent 34 may be applied in accordance with 3D object model wherever it is desirable for the final 3D object layer 30 to exhibit hydrophobicity. Utilizing a hydrophobic agent 34 that is separate from the fusing agent 26, 26' enables 3D objects with tailored hydrophobic areas to be formed. In the example shown in FIG. 3, the 3D object layer 30 is an outermost layer, and thus forms one surface of the 3D object. The hydrophobic agent 34 is applied to impart hydrophobicity to this surface of the 3D object.

The volume of the hydrophobic agent 34 that is applied per unit of the build material composition 12 in the portion 32 may depend upon whether it is desirable to impart hydrophobicity at the voxel surface and/or through the voxel volume, upon the desired hydrophobicity of the resulting portion(s) 36 of the 3D object layer 30, and the volume of the fusing agent 26, 26' that is applied.

The hydrophobic nature of the lipophilic moiety (R) of the organosilane and its corresponding polysiloxanes contributes to the hydrophobicity. The ability of the organosilane in the hydrophobic agent 34 to form polysiloxanes among the build material particles in situ (i.e., during the printing process) can also help to impart hydrophobicity. However, if too much of the hydrophobic agent 34 is applied, the polysiloxanes can form a physical barrier among the build material particles, which can prevent coalescence of the build material composition 12. As such, the ratio of hydrophobic agent 34 to fusing agent 26 or 26' is controlled in order to achieve both fusing and a desired level of hydrophobicity. In an example, a weight ratio of the organosilane in the selectively applied hydrophobic agent 34 to an energy absorber in the selectively applied fusing agent 26, 26' ranges from about 0.1 to about 5. In some examples, the organosilane is applied at an amount that is 1.5 times to 2.25 times more than the amount of the energy absorber that is applied.

In the example shown in FIG. 3, the detailing agent 38 is also selectively applied to the portion(s) 40 of the layer 10. The portion(s) 40 are not patterned with the fusing agent 26, 26' and thus are not to become part of the final 3D object layer 30. Thermal energy generated during radiation exposure may propagate into the surrounding portion(s) 40 that do not have the fusing agent 26, 26' applied thereto. The propagation of thermal energy may be inhibited, and thus the coalescence of the non-patterned build material portion(s) 40 may be prevented, when the detailing agent 38 is applied to these portion(s) 40.

After the agents 26 or 26', 34, and 38 are selectively applied in the specific portion(s) 28, 32, and 40 of the layer 10, the entire layer 10 of the build material composition 12 is exposed to electromagnetic radiation (shown as EMR in FIG. 3).

The electromagnetic radiation is emitted from the radiation source 24. The length of time the electromagnetic radiation is applied for, or energy exposure time, may be dependent, for example, on one or more of: characteristics of the radiation source 24; characteristics of the build material composition 12; and/or characteristics of the fusing agent 26, 26'.

It is to be understood that the electromagnetic radiation exposure may be accomplished in a single radiation event or in multiple radiation events. In an example, the exposing of the build material composition 12 is accomplished in multiple radiation events. In a specific example, the number of radiation events ranges from 3 to 8. In still another specific example, the exposure of the build material composition 12 to electromagnetic radiation may be accomplished in 3 radiation events. It may be desirable to expose the build material composition 12 to electromagnetic radiation in multiple radiation events to counteract a cooling effect that may be brought on by the amount of the agents 26 or 26', 34, 38 that is applied to the build material layer 10. Additionally, it may be desirable to expose the build material composition 12 to electromagnetic radiation in multiple radiation events to sufficiently elevate the temperature of the build material composition 12 in the portion(s) 28, 32, without over heating the build material composition 12 in the non-patterned portion(s) 40.

The fusing agent 26 or 26' enhances the absorption of the radiation, converts the absorbed radiation to thermal energy, and promotes the transfer of the thermal heat to the build material composition 12 in contact therewith. In an example, the fusing agent 26, 26' sufficiently elevates the temperature of the build material composition 12 in the portion 28 to a temperature above the melting point or within the melting range of the polymeric material, allowing coalescing/fusing (e.g., thermal merging, melting, binding, etc.) of the build material composition 12 to take place. The heat can also promote the formation of the polysiloxanes throughout the coalesced build material (e.g., by driving dehydration of any monomeric silanols), which may help to impart hydrophobicity to the formed layer 30. As such, the application of the electromagnetic radiation forms the 3D object layer 30, which, in some examples, includes a hydrophobic portion 36.

In some examples, the electromagnetic radiation has a wavelength ranging from 800 nm to 4000 nm, or from 800 nm to 1400 nm, or from 800 nm to 1200 nm. Radiation having wavelengths within the provided ranges may be absorbed (e.g., 80% or more of the applied radiation is absorbed) by the fusing agent 26, 26' and may heat the build material composition 12 in contact therewith, and may not be substantially absorbed (e.g., 25% or less of the applied radiation is absorbed) by the non-patterned build material composition 12 in portion(s) 40.

In the example shown in FIG. 3, the 3D object layer 30 has a portion 36 with hydrophobicity (which corresponds with the portion 32 patterned with both the fusing agent 26, 26' and the hydrophobic agent 34).

After the 3D object layer 30 is formed, additional layer(s) may be formed thereon to create an example of the 3D object. To form the next layer, additional build material composition 12 may be applied on the layer 30. The fusing agent 26 or 26' is then selectively applied on at least a portion of the additional build material composition 12, according to the 3D object model. The hydrophobic agent 34 may also be applied, for example, if increased hydrophobicity is desired in the next layer. The detailing agent 38 may be applied in any area of the additional build material composition 12 where coalescence is not desirable. After the agent(s) 26 or 26', 34, 38 is/are applied, the entire layer of the additional build material composition 12 is exposed to electromagnetic radiation in the manner described herein. The application of additional build material composition 12, the selective application of the agent(s) 26 or 26', 34, 38, and the electromagnetic radiation exposure may be repeated a predetermined number of cycles to form the final 3D object 30 in accordance with the 3D object model.

Some examples of the method 100 include repeating the applying of the polymeric build material 12, the selectively applying of the fusing agent 26 or 26', the selectively applying of the hydrophobic agent 34, and the exposing, to form a predetermined number of 3D object layers and a 3D printed object, wherein the hydrophobic portion 36 extends around an exterior of the 3D printed object. In these examples, the hydrophobic agent 34 may be applied on build material that is at or adjacent to object edges, according to the 3D object model.

Some examples of the method 100 also include selectively applying the hydrophobic agent 34 on the hydrophobic portion 36 of the 3D printed object. In these examples, the hydrophobic agent 34 may be selectively applied to the hydrophobic portions 36 in order to form a coating layer of the polysiloxanes on the exterior surfaces of the 3D printed object that already exhibit some hydrophobicity. The 3D object model may be used to identify the locations of the hydrophobic portion 36 so that the hydrophobic agent 34 is applied in the desirable areas.

Prior to selectively applying the hydrophobic agent 34 on the hydrophobic portion(s) 36, any non-coalesced build material particles may be removed from the 3D printed object via any suitable technique.

Printing with the Hydrophobic Agent and Both Fusing Agents

Figure 4:
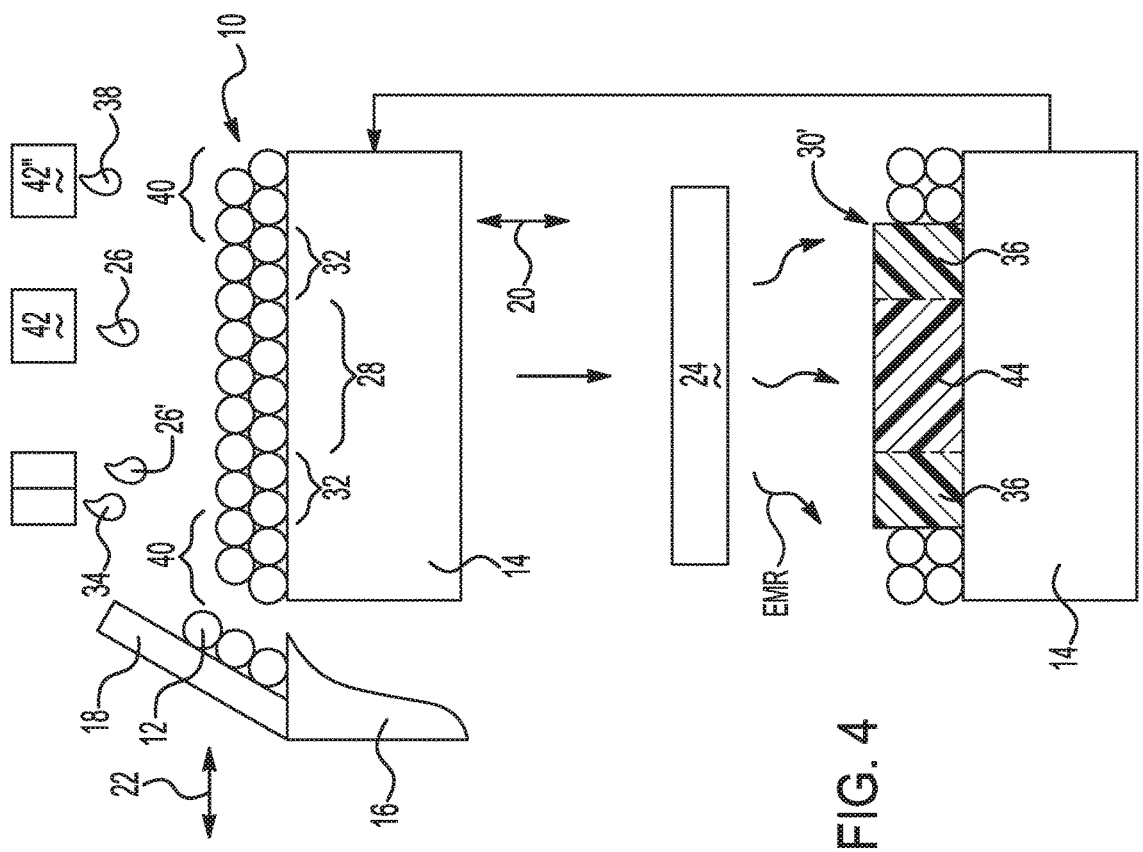
FIG. 4 is a schematic illustration of another example of a 3D printing method.

Referring now to FIG. 4, an example of the method which utilizes the hydrophobic agent 34 and both of the fusing agents 26 and 26' is depicted.

In FIG. 4, one layer 10 of the build material composition 12 is applied on the build area platform 14 as described in reference to FIG. 3. After the build material composition 12 has been applied, and prior to further processing, the build material layer 10 may be exposed to pre-heating as described in reference to FIG. 3.

In this example of the method, the core fusing agent(s) 26 is selectively applied on at least some of the build material composition 12 in the layer 10 to form a first patterned portion 28; and the primer fusing agent(s) 26' and the hydrophobic agent 34 are selectively applied on at least some of the build material composition 12 in the layer 10 to form second patterned portion(s) 32 that are adjacent to the first patterned portion 28. The first patterned portion 28 is generally located at an interior portion of the build material layer 10 and the second patterned portion 32 is generally located at an exterior portion of the build material layer 10 where it is desirable to impart hydrophobicity at one or more surface(s) of the 3D printed object layer 30'.

The volume of the core fusing agent 26 that is applied per unit of the build material composition 12 in the first patterned portion 28 may be sufficient to absorb and convert enough electromagnetic radiation so that the build material composition 12 in the patterned portion 28 will coalesce/fuse.

The volume of the primer fusing agent 26' that is applied per unit of the build material composition 12 in the second patterned portion 32 may be sufficient to absorb and convert enough electromagnetic radiation so that the build material composition 12 in the second patterned portion 32 will coalesce/fuse.

The volume of the hydrophobic agent 34 that is applied per unit of the build material composition 12 in the second patterned portion 32 may depend upon whether it is desirable to impart hydrophobicity at the voxel surface and/or through the voxel volume, upon the desired hydrophobicity of the resulting portion(s) 36 of the 3D object layer 30', and the volume of the primer fusing agent 26' that is applied. The weight ratio of the deposited organosilane to the deposited energy absorber may be controlled in order to achieve both coalescence and hydrophobicity.

In the example shown in FIG. 4, the detailing agent 38 is also selectively applied to the portion(s) 40 of the layer 10. The portion(s) 40 are not patterned with the fusing agent 26, 26' and thus are not to become part of the final 3D object layer 30'.

After the agents 26, 26', 34, and 38 are selectively applied in the specific portion(s) 28, 32, and 40 of the layer 10, the entire layer 10 of the build material composition 12 is exposed to electromagnetic radiation (shown as EMR in FIG. 4). Radiation exposure may be accomplished as described in reference to FIG. 3.

In this example, the respective fusing agents 26 and 26' enhance the absorption of the radiation, convert the absorbed radiation to thermal energy, and promote the transfer of the thermal heat to the build material composition 12 in contact therewith. In an example, the fusing agents 26, 26' sufficiently elevate the temperature of the build material composition 12 in the respective portions 28, 32 to a temperature above the melting point or within the melting range of the polymeric material, allowing coalescing/fusing (e.g., thermal merging, melting, binding, etc.) of the build material composition 12 to take place. As mentioned in reference to FIG. 3, the heat can also promote the formation of the polysiloxanes throughout the coalesced build material (e.g., by driving dehydration of any monomeric silanols), which may help to impart hydrophobicity to the portions 36 of formed layer 30'. The application of the electromagnetic radiation forms the 3D object layer 30', which, in this example, includes a core portion 44 (without added hydrophobicity) and hydrophobic portions 36 at opposed ends of the core portion 44.

FIG. 4 illustrates one example of how the core fusing agent 26, the primer fusing agent 26' and the hydrophobic agent 34 may be used together to pattern a single build material layer 10. In this particular example, the edges of the layer 30' are rendered hydrophobic.

When both fusing agents 26 and 26' are used to build up a 3D object, it may be desirable to utilize the core fusing agent 26 to form the core (e.g., the center or inner-most portion) of the 3D object, and it may be desirable to utilize the primer fusing agent 26' to form the outermost layers of the 3D object. The core fusing agent 26 can impart strength to the core of the 3D object, while the primer fusing agent 26' enables white or a color to be exhibited at the exterior of the 3D object. It is to be understood that the hydrophobic agent 34 may also be used to impart the desirable hydrophobicity to one or more surface portions 36 of the 3D object.

The method 100 shown in FIG. 2 may be modified to include both of the fusing agents 26, 26'. As one example, the method 100 shown in FIG. 2 may be used to form an outer layer (which is hydrophobic) of a 3D printed object, where the fusing agent used is the primer fusing agent 26', and the method 100 may further include forming a core of the 3D printed object by iteratively applying the polymeric build material 12 to form respective build material layers 10; selectively applying the core fusing agent 26 on the respective build material layers 10 to form respective patterned portions 28; and exposing the respective build material layers 10 to energy.

In this example, prior to exposing the respective build material layers 10 to energy, the method may further include patterning hydrophobic edges (similar to patterned portions 32 in FIG. 4) by selectively applying the primer fusing agent 26' on the respective build material layers 10 to form individual patterned portions 32 adjacent to the respective patterned portions 28 and selectively applying the hydrophobic agent 34 onto at least a portion of the individual patterned portions 32.

In this example, a hydrophobic base may also be formed prior to forming the core of the 3D printed object. In this example, the method would further include building the hydrophobic base by iteratively applying the polymeric build material 12 to form individual build material layers 10; selectively applying the primer fusing agent 26' on the individual build material layers 10 to form individual patterned portions 32; and selectively applying the hydrophobic agent 34 onto at least a portion of the individual patterned portions 32; and exposing the individual build material layers 10 to energy. In this example, the core of the 3D printed object is built on the hydrophobic base.

Figure 5:
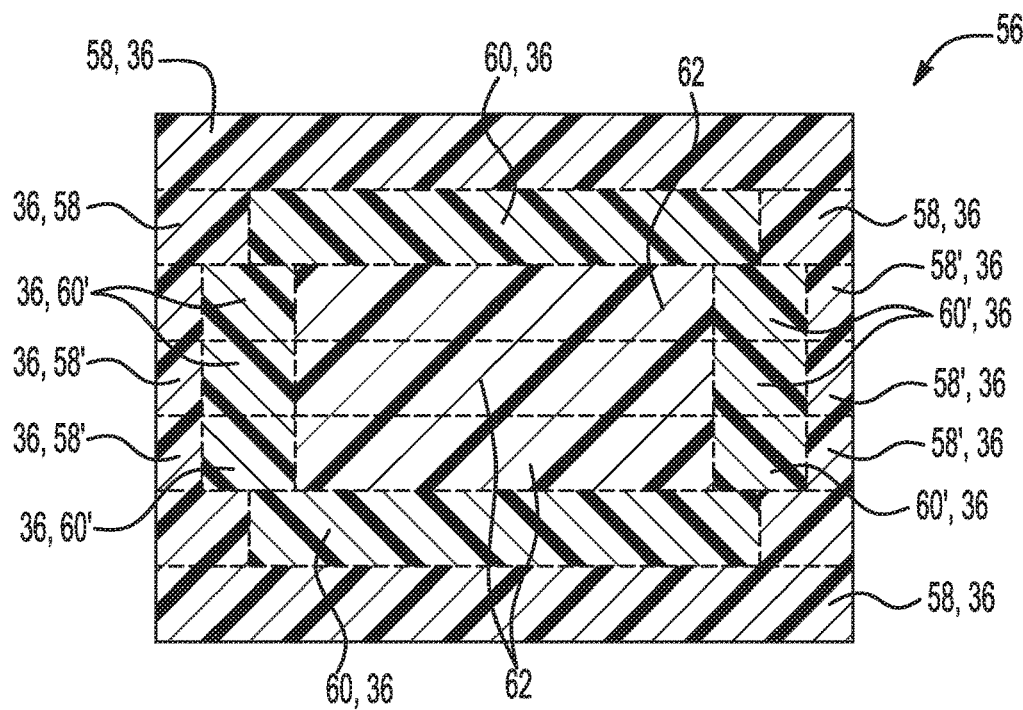
FIG. 5 is a cross-sectional view of an example 3D object.

This example of the method 100 may be used to form a 3D object 56 similar to that shown in FIG. 5, which includes a hydrophobic base (e.g., bottom layers 58, 36 and 60, 36), a core portion (layers 62), a hydrophobic outer layer (e.g., top layers (58, 36 and 60, 36)), and hydrophobic edges (e.g., side layers 58', 36 and 60', 36). In some examples, the hydrophobic agent 34 may also be selectively applied on the hydrophobic base and/or on the hydrophobic portion(s) of the top outer layer and/or on the hydrophobic edges.

Figure 7:
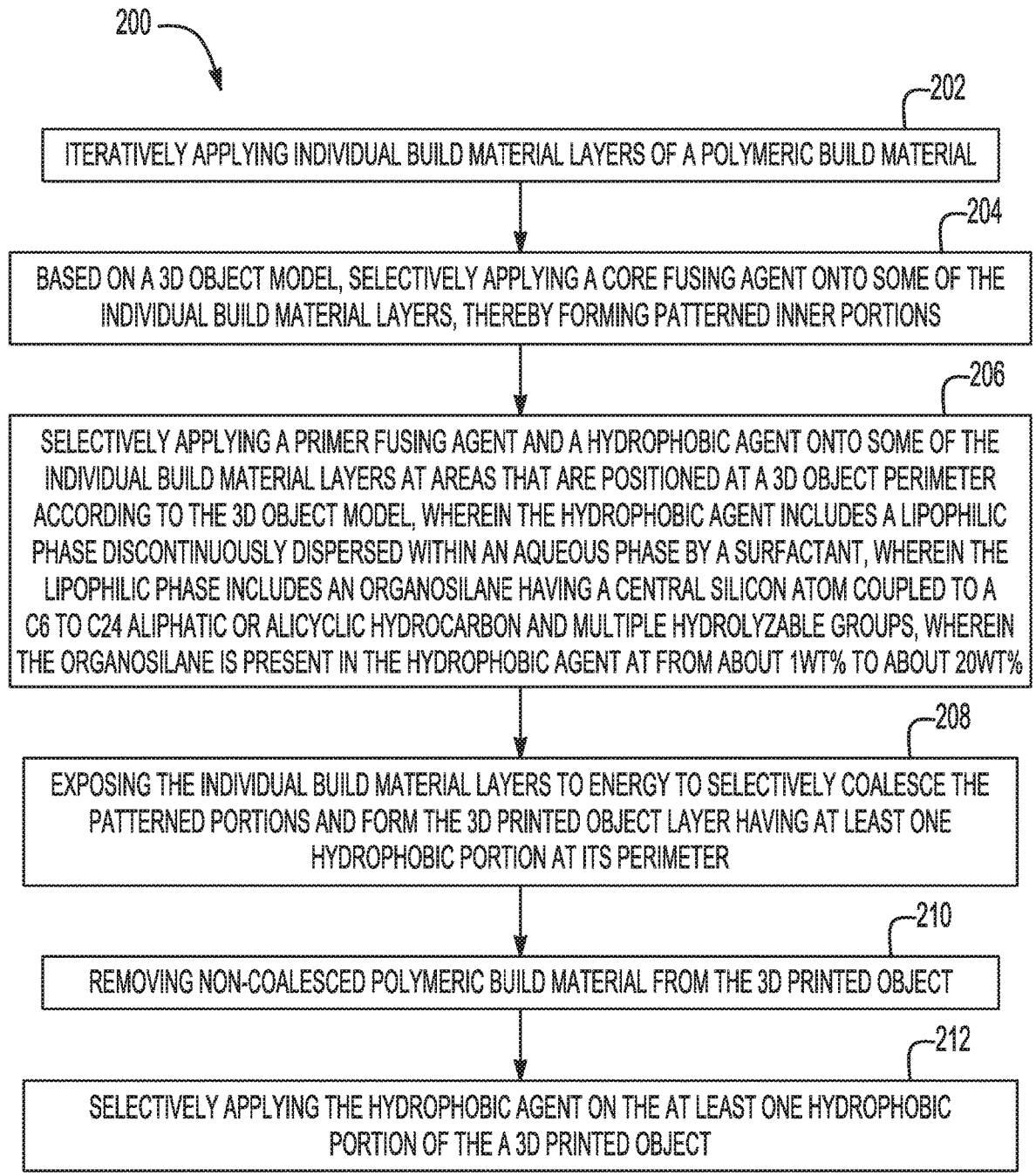
FIG. 7 is a flow diagram depicting yet another example of a 3D printing method.

Another example of the method that may be used to form this type of 3D object 56 is shown in FIG. 7. The method 200 shown in FIG. 7 includes iteratively applying individual build material layers of a polymeric build material (reference numeral 202); based on a 3D object model, selectively applying a core fusing agent onto some of the individual build material layers, thereby forming patterned inner portions (reference numeral 204); selectively applying a primer fusing agent and a hydrophobic agent onto some of the individual build material layers at areas that are positioned at a 3D object perimeter according to the 3D object model, wherein the hydrophobic agent includes a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt % (reference numeral 206); exposing the individual build material layers to energy to selectively coalesce the patterned portions and form the 3D printed object having at least one hydrophobic portion at its perimeter (reference numeral 208); removing non-coalesced polymeric build material from the 3D printed object (reference numeral 210); and selectively applying the hydrophobic agent on the at least one hydrophobic portion of the 3D printed object (reference numeral 212).

In this example of the method 200, the entire perimeter may be patterned with the primer fusing agent 26' and the hydrophobic agent 34, or selected layers (bottom, top) and/or edges/sides may be patterned with the primer fusing agent 26' and the hydrophobic agent 34. For example, i) the primer fusing agent 26' and the hydrophobic agent 34 may be selectively applied at edges (similar to portions 32 in FIG. 4) of the patterned inner portions 28 (FIG. 4), and the edges may also be adjacent to non-patterned polymeric build material (e.g., portions 40 in FIG. 4); or ii) the primer fusing agent 26' and the hydrophobic agent 34 may be selectively applied to an outermost plurality of the individual build material layers (e.g., top and/or bottom layers 58, 36 and 60, 36 in FIG. 5); or iii) both i and ii.

Using the method 200 to form the 3D object 56 in FIG. 5, the outermost build material layer(s) and the outermost edges of the middle build material layers would be patterned with the primer fusing agent 26' and the hydrophobic agent 34 to form 3D object layers 58, 60 and 3D object layer edges 58', 60', each of which has the hydrophobic portion 36. Also in this example, the innermost portions of the middle build material layers would be patterned with the core fusing agent 26 to form the core layers 62 of the 3D printed object 56. This example illustrates the hydrophobic portion 36 at the entire exterior (perimeter) of the 3D object 56, but it is to be understood that the hydrophobic agent 34 may be selectively applied so that portions of the exterior (perimeter) are rendered more hydrophobic, while other portions of the exterior (perimeter) are not rendered more hydrophobic.

In the example shown in FIG. 5, the coloring agent may also be applied with the primer fusing agent 26' to generate color at the exterior surfaces of the object 56. For example, the coloring agent may be applied with the primer fusing agent 26' and the hydrophobic agent 34 on the build material that forms the 3D object layers 58 and the 3D object edges 58'. Since the primer fusing agent 26' is clear or slightly tinted and the build material composition 12 is white or off-white, the color of the coloring agent will be the color of the resulting 3D object layers 58 and the 3D object edges 58'. The colorant of the coloring agent becomes embedded throughout the coalesced/fused build material composition of the 3D object layers 58 and the 3D object edges 58'. In this example, the 3D object layers 60 and the 3D object edges 60' (which are white or slightly tinted) may or may not have the coloring agent applied thereto. These intermediate layers 60 and edges 60' may help to form a mask over the black (or dark colored) core layers 62 because they optically isolate the core layers 62.

Figure 6:
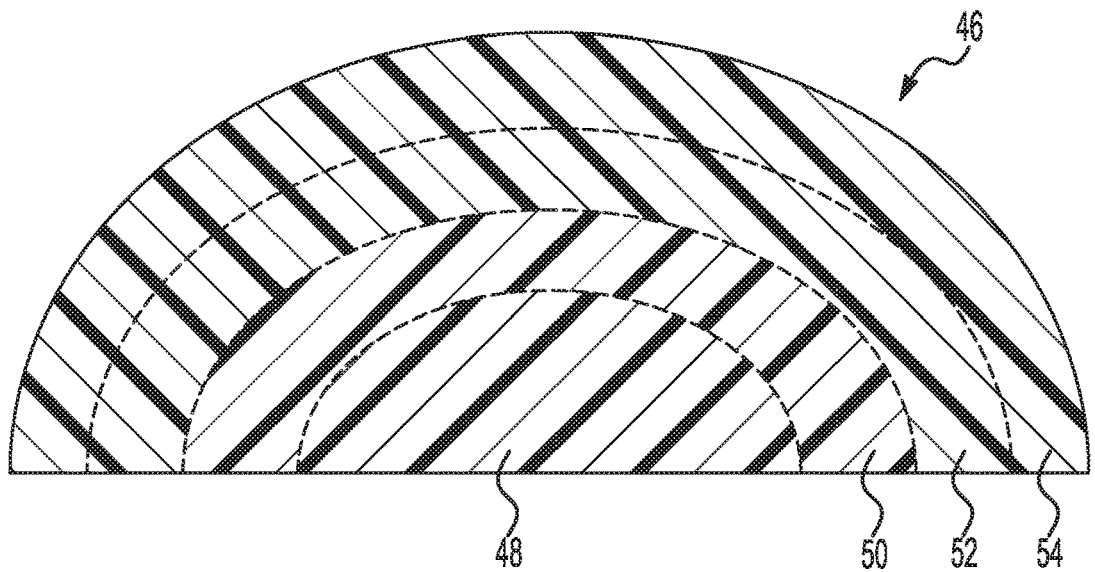
FIG. 6 is a cross-sectional view of another example of a 3D object.

Another example of a 3D object 46 formed with the primer fusing agent 26' and the hydrophobic agent 34 and the core fusing agent 26 is shown in FIG. 6. To form this example of the 3D object 46, the core fusing agent 26 would be applied on multiple layers of the build material composition 12 to pattern and ultimately form the inner portions 48 and 50 of the 3D printed object 46, and the primer fusing agent 26' and the hydrophobic agent 34 would be applied on multiple layers of the build material composition 12 to pattern and ultimately form the outermost portions 52 and 54 of the 3D printed object 46. After each build material layer 10 is patterned with the agent(s) 26 and/or 26' and 34, electromagnetic radiation may be applied to solidify the respective patterned build material layers.

After the formation of the 3D object, non-coalesced build material may be removed and the hydrophobic agent 34 may be selectively applied to any of the hydrophobic portions 36. To impart color at these portions, the coloring agent may also be applied with the hydrophobic agent 34.

While several variations of the objects 46, 56 and the combinations of fusing agents 26, 26' have been described, it is to be understood that the fusing agents 26, 26' may be used to form any desirable 3D object.

In any of the examples of the method 100, 200 disclosed herein, any of the agents (fusing agent 26, 26', hydrophobic agent 34, detailing agent 38 and/or coloring agent) may be dispensed from an applicator 42, 42', 42" (shown in FIG. 3 and FIG. 4). The applicator(s) 42, 42', 42" may each be a thermal inkjet printhead, a piezoelectric printhead, a continuous inkjet printhead, etc., and the selective application of the fusing agent 26, 26', hydrophobic agent 34, detailing agent 38 and/or coloring agent may be accomplished by thermal inkjet printing, piezo electric inkjet printing, continuous inkjet printing, etc. The controller may process data, and in response, control the applicator(s) 42, 42', 42" to deposit the fusing agent 26, 26', hydrophobic agent 34, detailing agent 38 and/or coloring agent onto predetermined portion(s) of the build material composition 12. It is to be understood that the applicators 42, 42', 42" may be separate applicators or a single applicator with several individual cartridges for dispensing the respective agents.

It is to be understood that the selective application of any of the fusing agent 26, 26', hydrophobic agent 34, detailing agent 38 and/or coloring agent may be accomplished in a single printing pass or in multiple printing passes. In some examples, the agent(s) is/are selectively applied in a single printing pass. In some other examples, the agent(s) is/are selectively applied in multiple printing passes. In one of these examples, the number of printing passes ranging from 2 to 4. In still other examples, 2 or 4 printing passes are used. It may be desirable to apply the fusing agent 26, 26', hydrophobic agent 34, detailing agent 38 and/or coloring agent in multiple printing passes to increase the amount, e.g., of the energy absorber, polyelectrolyte, colorant, etc. that is applied to the build material composition 12, to avoid liquid splashing, to avoid displacement of the build material composition 12, etc.

In any of the examples of the method 100, 200 disclosed herein, differently shaped objects may be printed in different orientations within the printing system. As such, while the object may be printed from the bottom of the object to the top of the object, it may alternatively be printed starting with the top of the object to the bottom of the object, or from a side of the object to another side of the object, or at any other orientation that is suitable or desired for the particular geometry of the part being formed.

To further illustrate the present disclosure, an example is given herein. It is to be understood that this example is provided for illustrative purposes and is not to be construed as limiting the scope of the present disclosure.

Example

An example of the hydrophobic agent (HA1) was prepared with an organosilane emulsion. The formulation of the organosilane emulsion is shown in Table 1. The weight percentages in Table 1 represent the active amount.

TABLE 1

| Category | Ingredient | Organosilane Emulsion (wt %) |
|---|---|---|
| Organosilane | Hexyltriethoxysilane | 10 |
| Surfactant | DOWFAX ™ | 8.0 |
| Acid | Acetic acid | 1.0 |
| Solvent | Deionized Water | Balance |

The organosilane emulsion was prepared by adding the hexyltriethoxysilane slowly to a mixture of the surfactant in water and acetic acid. The mixture was agitated for 15 to 20 minutes after the addition of the silane, and then the mixture was allowed to stand undisturbed from about 48 hours to about 72 hours at room temperature (e.g., from about 18° C. to about 22° C.).

The silane emulsion was incorporated into a vehicle to form the example hydrophobic agent (HA1). Two different control agents (Control 1 and Control 2) were used as comparative fluids, and neither of them included a silane. Control 1 had the same vehicle as HA 1, but did not include the silane emulsion. Control 2 had a slightly different vehicle than HA 1, and also did not include the silane emulsion. The formulations are shown in Table 2. The weight percentages in Table 2 represent the active amount unless noted otherwise with the phrase "as is". As such, the amount set forth for the silane emulsion in Table 2 represents the amount of Hexyltriethoxysilane in the formulation, and does not account for the water or surfactant or acid introduced with the silane.

TABLE 2

| Category | Ingredient | HA 1 (wt %) | Control 1 (wt %) | Control 2 (wt %) |
|---|---|---|---|---|
| Organosilane | Silane Emulsion from Table 1 | 5.0 | — | — |
| Organic Co-solvent | 2-Pyrrolidone | 19 | 19 | 4 |
| Surfactant | Tergitole 15-S-12 | — | — | 0.85 |
|  | Tergitole 15-S-9 | 0.85 | 0.85 | — |
| Anti-kogation Agent | Crodafos ® O3A | 0.5 | 0.5 | 0.5 |
| Chelator | Trilon ® M (as is) | 0.02 | 0.02 | 0.05 |
| Biocide | Acticide ® B20 (as is) | 0.2 | 0.2 | 0.18 |
| Buffer | TRIZMA ® | 0.2 | 0.2 | 0.1 |
| Solvent | Water | Balance | Balance | Balance |

HA 1 was printed with a thermal inkjet printer to determine the printability and decap performance of the hydrophobic agent. The hydrophobic agent HA 1 exhibited acceptable printing performance.

HA 1 and the control agents 1 and 2 were used in a 3D printing process. The build material was polyamide-12 (with added $TiO_2$) and the fusing agent formulation is shown in Table 3. The weight percentages in Table 3 represent the active amount unless noted otherwise with the phrase "as is".

TABLE 3

| Category | Ingredient | FA (wt %) |
| --- | --- | --- |
| Energy Absorber | CTO dispersion | 8 |
| Organic Co-Solvent | 2-pyrollidone | 19 |
| Surfactant | Tergitol ® 15-S-9 | 0.75 |
| Anti-kogation Agent | Crodafos ® O3A | 0.5 |
| Chelator | Trilon ® M (as is) | 0.0064 |
| Biocide | Acticide ® B20 | 0.036 |
| Stabilizers | Betaine (from CTO dispersion) | 8 |
|  | Beta-alanine | 3 |
| Solvent | Water | Balance |

A layer of the polyamide-12 build material was spread on a build area platform and then was patterned with the fusing agent and exposed to electromagnetic radiation. Additional layers were printed in a similar manner to form cubes.

After printing, control 1 was applied to the surface of control cube 1, control 2 was applied to the surface of control cube 2, no additional agent was applied to control cube 3, and HA 1 was applied to the surface of the example cube 1.

A drop of deionized water was deposited on each of the cubes to perform a qualitative contact angle measurement test. Pictures of the cubes were taken at T=0 (when the water droplets were deposited) and at T=5 (5 minutes after the water droplets were deposited). The T=0 picture is reproduced as FIG. 8A and the T=5 picture is reproduced as FIG. 8B. In each of these figures, example cube 1 (HA 1 at the exterior) is at the far left, control cube 1 (control 1 at the exterior) is at the left middle, control cube 3 (no additional agent at the exterior) is at the right middle, and control cube 2 (control 2 at the exterior) is on the right.

The contact angle was observed, as this indicates the wetting of a solid by a liquid. A high contact angle, greater than 90°, indicates poor spreading of the liquid on the surface and poor wetting.

As shown in FIG. 8A, the contact angle of example cube 1 was greater than 90° from the moment the water droplet was dispensed. At T=0, the contact of control cube 1 was close to 90°. Because control cube 1 was treated with control 1 (which had the same vehicle as HA 1, but no silane), it was concluded that the hydrophobicity modification observed in example cube 1 was due to the silane. Both control cubes 2 and 3 also had contact angles close to 90°, indicating that they do not effectively modulate the surface hydrophobicity. The results confirmed the effect of the organosilane.

As shown in FIG. 8B, example cube 1 did not show a significant change in contact angle after five minutes. This illustrated that the hydrophobicity was a permanent, not transient, effect. The surface of example cube 1 had been irreversibly changed in terms of the hydrophobic property. Surface wetting was observed with control cubes 1 and 2, as the contact angles fell below 90°.

These experiments indicate that an organosilane can be used to efficiently alter the hydrophobicity of a 3D object surface using the hydrophobic agent disclosed herein.

Another example cube (example cube 2) and another control cube (control cube 4) were printed. Control cube 4 was printed with the fusing agent and control 1 in the outermost layers (3-5 layers) on each side of the cube. Example cube 2 was printed with the fusing agent and HA 1 in the outermost layers (3-5 layers) on each side of the cube. The weight ratios of HA 1: fusing agent for the example cube 2 and of control 1: fusing agent for control cube 4 were the same, and the weight ratio of the organosilane: energy absorber was in accordance with the examples disclosed herein (e.g., 1:1-5:1).

A drop of deionized water was deposited on each of the cubes to perform a qualitative contact angle measurement test. Pictures of the cubes were taken at T=0 (when the water droplets were deposited), at T=5 (5 minutes after the water droplets were deposited), and at T=15 (15 minutes after the water droplets were deposited). The T=0 picture is reproduced as FIG. 9A, the T=5 picture is reproduced as FIG. 9B, and the T=15 picture is reproduced as FIG. 9C. In each of these figures, example cube 2 (HA 1 in outer layers and on exterior) is on the left and control cube 4 (control 1 in outer layers and on exterior) in in on the right.

Figure 9A:
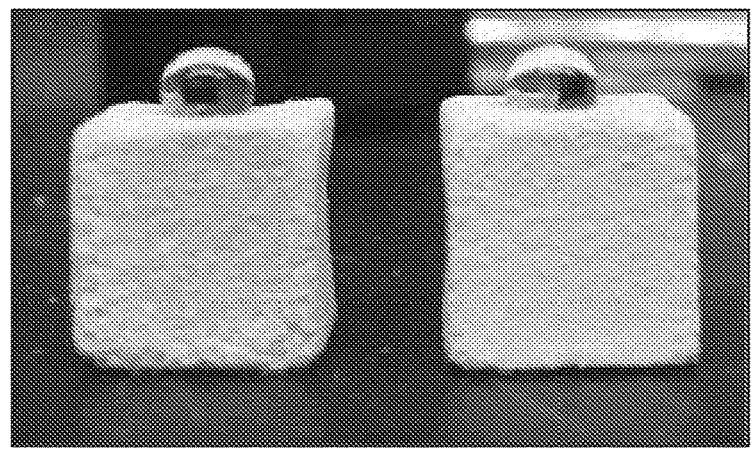
FIG. 9A through FIG. 9C are black and white reproductions of originally colored photographs depicting example and comparative example 3D printed objects at different times during a deionized water droplet test.
Figure 9B:
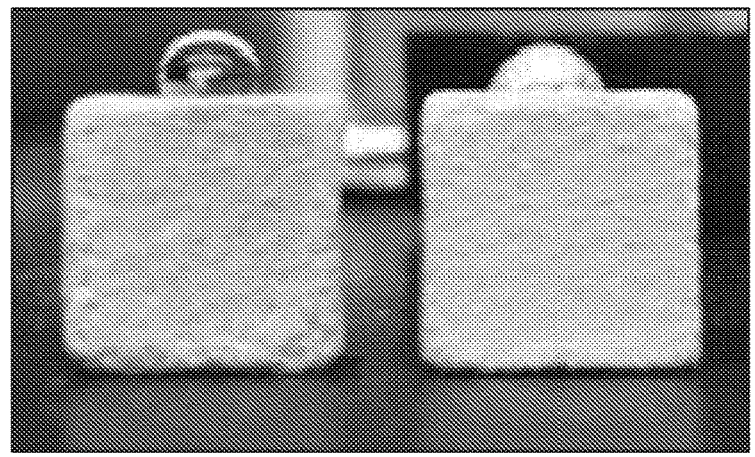
Figure 9C:
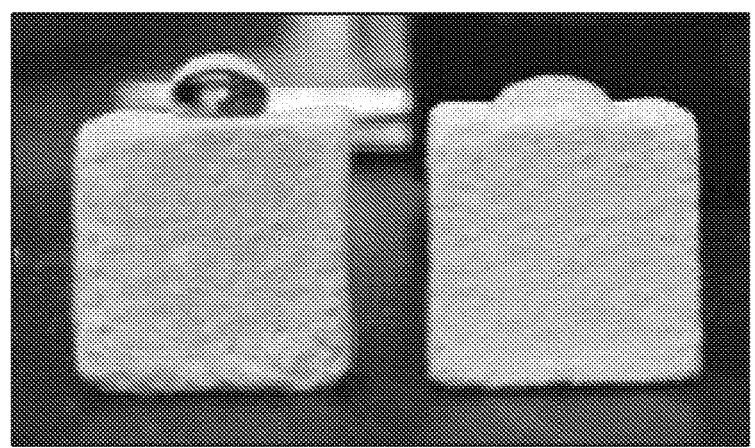

The contact angle was observed. In FIG. 9A, the contact angles were similar for example cube 2 and control cube 4. However, as shown in FIG. 9B and FIG. 9C, after five and fifteen minutes, example cube 2 did not show a significant change in contact angle. In contrast, significant surface wetting was observed with control cube 4, as the contact angle fell well below 90°. This again illustrated that the hydrophobicity of the example cube was a permanent, not transient, effect. The surface of example cube 2 had been irreversibly changed in terms of the hydrophobic property.

It is to be understood that the ranges provided herein include the stated range and any value or sub-range within the stated range, as if such values or sub-ranges were explicitly recited. For example, from about 1 wt % to about 20 wt % should be interpreted to include not only the explicitly recited limits of from about 1 wt % to about 20 wt %, but also to include individual values, such as about 1.5 wt %, about 14 wt %, about 7.75 wt %, about 19 wt %, etc., and sub-ranges, such as from about 1.25 wt % to about 10 wt %, from about 3.2 wt % to about 15.2 wt %, from about 3 wt % to about 8 wt %, etc.

As used herein, the term "about" is used to provide flexibility to a numerical range endpoint by providing that a given value may be "a little above" or "a little below" the endpoint. The degree of flexibility of this term can be dictated by the particular variable and would be within the knowledge of those skilled in the art to determine based on experience and the associated description herein. As an example, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

What is claimed is:

1. A method for three-dimensional (3D) printing, comprising:
applying a polymeric build material to form a build material layer;
based on a 3D object model, selectively applying a fusing agent onto the build material layer, thereby forming a patterned portion;
based on the 3D object model, selectively applying a hydrophobic agent onto at least a portion of the patterned portion, wherein the hydrophobic agent comprises a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt %; and
exposing the build material layer to energy to selectively coalesce the patterned portion and form a 3D object layer having a hydrophobic portion.

2. The method as defined in claim 1 wherein a weight ratio of the selectively applied organosilane in the hydrophobic agent to an energy absorber in the selectively applied fusing agent ranges from about 0.1 to about 5.

3. The method as defined in claim 1 wherein:
the 3D object layer having the hydrophobic portion is an outer layer of a 3D printed object;
the fusing agent is a primer fusing agent; and
prior to forming the outer layer, the method further comprises forming a core of the 3D printed object by:
iteratively applying the polymeric build material to form respective build material layers;
selectively applying a core fusing agent on the respective build material layers to form respective patterned portions; and
exposing the respective build material layers to energy.

4. The method as defined in claim 3 wherein prior to exposing the respective build material layers to energy, the method further comprises patterning hydrophobic edges by:
selectively applying the primer fusing agent on the respective build material layers to form individual patterned portions adjacent to the respective patterned portions; and
selectively applying the hydrophobic agent onto at least a portion of the individual patterned portions.

5. The method as defined in claim 4, further comprising selectively applying the hydrophobic agent on the hydrophobic portion and the hydrophobic edges.

6. The method as defined in claim 3 wherein:
prior to forming the core of the 3D printed object, the method further comprises building a hydrophobic base by:
iteratively applying the polymeric build material to form individual build material layers;
selectively applying the primer fusing agent on the individual build material layers to form individual patterned portions;
selectively applying the hydrophobic agent onto at least a portion of the individual patterned portions; and
exposing the individual build material layers to energy; and
the core of the 3D printed object is built on the hydrophobic base.

7. The method as defined in claim 6, further comprising selectively applying the hydrophobic agent on the hydrophobic base and the hydrophobic portion.

8. The method as defined in claim 1, further comprising repeating the applying of the polymeric build material, the selectively applying of the fusing agent, the selectively applying of the hydrophobic agent, and the exposing to form a predetermined number of 3D object layers and a 3D printed object, wherein the hydrophobic portion extends around an exterior of the 3D printed object.

9. The method as defined in claim 8, further comprising selectively applying the hydrophobic agent on the hydrophobic portion of the 3D printed object.

10. A method of modifying surface hydrophobicity of a three-dimensional (3D) printed object, comprising:
iteratively applying individual build material layers of a polymeric build material;
based on a 3D object model, selectively applying a core fusing agent onto some of the individual build material layers, thereby forming patterned inner portions;
selectively applying a primer fusing agent and a hydrophobic agent onto some of the individual build material layers at areas that are positioned at a 3D object perimeter according to the 3D object model, wherein the hydrophobic agent includes a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt %;
exposing the individual build material layers to energy to selectively coalesce the patterned portions and form the 3D printed object having at least one hydrophobic portion at its perimeter;
removing non-coalesced polymeric build material from the 3D printed object; and
selectively applying the hydrophobic agent on the at least one hydrophobic portion of the 3D printed object.

11. The method as defined in claim 10 wherein:
i) the primer fusing agent and the hydrophobic agent are selectively applied at edges of the patterned inner portions, and wherein the edges are adjacent to non-patterned polymeric build material; or
ii) the primer fusing agent and the hydrophobic agent are applied to an outermost plurality of the individual build material layers; or
iii) both i and ii.

12. A multi-fluid kit, comprising:
a hydrophobic agent including a lipophilic phase discontinuously dispersed within an aqueous phase by a surfactant, wherein the lipophilic phase includes an organosilane having a central silicon atom coupled to a C6 to C24 aliphatic or alicyclic hydrocarbon and multiple hydrolyzable groups, wherein the organosilane is present in the hydrophobic agent at from about 1 wt % to about 20 wt %;

a core fusing agent including an energy absorber having absorption at wavelengths ranging from 400 nm to 4000 nm; and a primer fusing agent including a plasmonic resonance absorber having absorption at wavelengths ranging from 800 nm to 4000 nm and having transparency at wavelengths ranging from 400 nm to 780 nm.

13. The multi-fluid kit as defined in claim 12, further comprising a detailing agent.

14. The multi-fluid kit as defined in claim 12, further comprising a coloring agent.

15. The multi-fluid kit as defined in claim 12 wherein the organosilane is a trialkoxyorganosilane compound including a C6 to C14 aliphatic or alicyclic hydrocarbon.

16. The multi-fluid kit as defined in claim 12 wherein the C6 to C24 aliphatic or alicyclic hydrocarbon is free of aromatic hydrocarbons.

* * * * *